(12) United States Patent
Dougherty

(10) Patent No.: US 7,532,955 B2
(45) Date of Patent: May 12, 2009

(54) DISTRIBUTED PROTECTION SYSTEM FOR POWER DISTRIBUTION SYSTEMS

(75) Inventor: John J. Dougherty, Collegeville, PA (US)

(73) Assignee: General Electric Company, Schenectady, NY (US)

(*) Notice: Subject to any disclaimer, the term of this patent is extended or adjusted under 35 U.S.C. 154(b) by 520 days.

(21) Appl. No.: 11/203,951

(22) Filed: Aug. 15, 2005

(65) Prior Publication Data

US 2005/0273207 A1    Dec. 8, 2005

Related U.S. Application Data

(63) Continuation-in-part of application No. 10/373,680, filed on Feb. 25, 2003, now Pat. No. 7,058,482.

(60) Provisional application No. 60/359,544, filed on Feb. 25, 2002, provisional application No. 60/438,159, filed on Jan. 6, 2003.

(51) Int. Cl.
    *G05D 5/00*      (2006.01)
    *H02H 7/00*      (2006.01)
(52) U.S. Cl. ................. 700/286; 700/291; 700/292; 700/293; 700/294; 700/295; 700/297; 361/64
(58) Field of Classification Search ............ 700/286, 700/291–295, 297; 361/64
    See application file for complete search history.

(56) References Cited

U.S. PATENT DOCUMENTS

| 3,772,505 | A | 11/1973 | Massell |
| 3,938,007 | A | 2/1976 | Boniger et al. |
| 3,956,671 | A | 5/1976 | Nimmersjo |
| 3,963,964 | A | 6/1976 | Mustaphi |
| 4,001,742 | A | 1/1977 | Jencks et al. |
| 4,245,318 | A | 1/1981 | Eckart et al. |
| 4,291,299 | A | 9/1981 | Hinz et al. |

(Continued)

FOREIGN PATENT DOCUMENTS

CN    1302465 A    7/2001

(Continued)

OTHER PUBLICATIONS

Atanackovic D. et al. An Integrated Knowledge-Based Model for Power-System Planning IEEE Expert, IEEE Inc. New York, Jul. 1997; pp. 65-71.

*Primary Examiner*—Albert DeCady
*Assistant Examiner*—Thomas H Stevens
(74) *Attorney, Agent, or Firm*—Ohlandt, Greeley, Ruggiero & Perle, L.L.P.

(57) ABSTRACT

There is disclosed a protection system for a power distribution system having a plurality of breakers arranged in a hierarchy. The protection system has a network and a breaker coupled to the power distribution system. A module is coupled to the network and the breaker is at a first level in the hierarchy. The module samples an electrical condition of the power distribution system at the breaker and monitors the electrical condition for a predetermined trip condition. The module, upon detection of the predetermined trip condition, trips said breaker if the first level is a lowest level of the hierarchy, but monitors the network for a notification message if the first level is not the lowest level of the hierarchy.

19 Claims, 11 Drawing Sheets

U.S. PATENT DOCUMENTS

| | | | |
|---|---|---|---|
| 4,301,433 A | 11/1981 | Castonguay et al. | |
| 4,311,919 A | 1/1982 | Nail | |
| 4,352,138 A | 9/1982 | Gilker | |
| 4,415,968 A | 11/1983 | Maeda et al. | |
| 4,423,459 A | 12/1983 | Stich et al. | |
| 4,432,031 A | 2/1984 | Premerlani | |
| 4,455,612 A | 6/1984 | Girgis et al. | |
| 4,468,714 A | 8/1984 | Russell | |
| 4,589,074 A | 5/1986 | Thomas et al. | |
| 4,623,949 A | 11/1986 | Salowe et al. | |
| 4,631,625 A | 12/1986 | Alexander et al. | |
| 4,642,724 A | 2/1987 | Ruta | |
| 4,652,966 A | 3/1987 | Farag et al. | |
| 4,672,501 A | 6/1987 | Bilac et al. | |
| 4,672,555 A | 6/1987 | Hart et al. | |
| 4,674,062 A | 6/1987 | Premerlani | |
| 4,689,712 A | 8/1987 | Demeyer | |
| 4,709,339 A | 11/1987 | Fernandes | |
| 4,751,653 A | 6/1988 | Junk et al. | |
| 4,752,853 A | 6/1988 | Matsko et al. | |
| 4,754,407 A | 6/1988 | Nolan | |
| 4,777,607 A | 10/1988 | Maury et al. | |
| 4,783,748 A | 11/1988 | Swarztrauber et al. | |
| 4,788,647 A * | 11/1988 | McManus et al. | 700/287 |
| 4,796,027 A | 1/1989 | Smith-Vaniz | |
| 4,833,592 A | 5/1989 | Yamanaka | |
| 4,849,848 A | 7/1989 | Ishii | |
| 4,855,671 A | 8/1989 | Fernandes | |
| 4,862,308 A | 8/1989 | Udren | |
| 4,964,058 A | 10/1990 | Brown, Jr. | |
| 4,977,529 A * | 12/1990 | Gregg et al. | 703/18 |
| 4,979,122 A | 12/1990 | Davis et al. | |
| 4,983,955 A | 1/1991 | Ham, Jr. et al. | |
| 4,996,646 A | 2/1991 | Farrington | |
| 5,053,735 A | 10/1991 | Ohishi et al. | |
| 5,060,166 A | 10/1991 | Engel et al. | |
| 5,101,191 A | 3/1992 | MacFadyen et al. | |
| 5,134,691 A | 7/1992 | Elms | |
| 5,136,458 A | 8/1992 | Durivage, III | |
| 5,162,664 A | 11/1992 | Haun et al. | |
| 5,166,887 A | 11/1992 | Farrington et al. | |
| 5,170,310 A | 12/1992 | Studtmann et al. | |
| 5,170,360 A | 12/1992 | Porter et al. | |
| 5,179,376 A | 1/1993 | Pomatto | |
| 5,182,547 A | 1/1993 | Griffith | |
| 5,185,705 A | 2/1993 | Farrington | |
| 5,196,831 A | 3/1993 | Bscheider | |
| 5,214,560 A | 5/1993 | Jensen | |
| 5,216,621 A | 6/1993 | Dickens | |
| 5,225,994 A | 7/1993 | Arinobu et al. | |
| 5,231,565 A | 7/1993 | Bilas et al. | |
| 5,237,511 A | 8/1993 | Caird et al. | |
| 5,247,454 A | 9/1993 | Farrington et al. | |
| 5,253,159 A | 10/1993 | Bilas et al. | |
| 5,272,438 A | 12/1993 | Stumme | |
| 5,301,121 A | 4/1994 | Garverick et al. | |
| 5,305,174 A | 4/1994 | Morita et al. | |
| 5,311,392 A | 5/1994 | Kinney et al. | |
| 5,323,307 A | 6/1994 | Wolf et al. | |
| 5,353,188 A | 10/1994 | Hatakeyama | |
| 5,361,184 A | 11/1994 | El-Sharkawi et al. | |
| 5,367,427 A | 11/1994 | Matsko et al. | |
| 5,369,356 A | 11/1994 | Kinney et al. | |
| 5,381,554 A | 1/1995 | Langer et al. | |
| 5,384,712 A | 1/1995 | Oravetz et al. | |
| 5,402,299 A | 3/1995 | Bellei | |
| 5,406,495 A | 4/1995 | Hill | |
| 5,414,635 A | 5/1995 | Ohta | |
| 5,420,799 A | 5/1995 | Peterson et al. | |
| 5,422,778 A | 6/1995 | Good et al. | |
| 5,440,441 A | 8/1995 | Ahuja | |
| 5,451,879 A | 9/1995 | Moore | |
| 5,487,016 A | 1/1996 | Elms | |
| 5,490,086 A | 2/1996 | Leone et al. | |
| 5,493,468 A | 2/1996 | Hunter et al. | |
| 5,530,738 A | 6/1996 | McEachern | |
| 5,534,782 A | 7/1996 | Nourse | |
| 5,534,833 A | 7/1996 | Castonguay et al. | |
| 5,537,327 A | 7/1996 | Snow et al. | |
| 5,544,065 A | 8/1996 | Engel et al. | |
| 5,559,719 A | 9/1996 | Johnson et al. | |
| 5,560,022 A | 9/1996 | Dunstan et al. | |
| 5,576,625 A | 11/1996 | Sukegawa et al. | |
| 5,581,471 A | 12/1996 | McEachern et al. | |
| 5,587,917 A | 12/1996 | Elms | |
| 5,596,473 A | 1/1997 | Johnson et al. | |
| 5,600,527 A | 2/1997 | Engel et al. | |
| 5,608,646 A | 3/1997 | Pomatto | |
| 5,613,798 A | 3/1997 | Braverman | |
| 5,619,392 A | 4/1997 | Bertsch et al. | |
| 5,627,716 A | 5/1997 | Lagree et al. | |
| 5,627,717 A | 5/1997 | Pein et al. | |
| 5,627,718 A | 5/1997 | Engel et al. | |
| 5,629,825 A | 5/1997 | Wallis et al. | |
| 5,631,798 A | 5/1997 | Seymour et al. | |
| 5,638,296 A | 6/1997 | Johnson et al. | |
| 5,650,936 A | 7/1997 | Loucks et al. | |
| 5,661,658 A | 8/1997 | Putt et al. | |
| 5,666,256 A | 9/1997 | Zavis et al. | |
| 5,670,923 A | 9/1997 | Gonzalez et al. | |
| 5,694,329 A | 12/1997 | Pomatto | |
| 5,696,695 A | 12/1997 | Ehlers et al. | |
| 5,719,738 A | 2/1998 | Singer et al. | |
| 5,734,576 A | 3/1998 | Klancher | |
| 5,736,847 A | 4/1998 | Van Doorn et al. | |
| 5,737,231 A | 4/1998 | Pyle et al. | |
| 5,742,513 A | 4/1998 | Bouhenguel et al. | |
| 5,751,524 A | 5/1998 | Swindler | |
| 5,754,033 A | 5/1998 | Thomson | |
| 5,754,440 A | 5/1998 | Cox et al. | |
| 5,768,148 A | 6/1998 | Murphy et al. | |
| 5,784,237 A | 7/1998 | Velez | |
| 5,784,243 A | 7/1998 | Pollman et al. | |
| 5,786,699 A | 7/1998 | Sukegawa et al. | |
| 5,808,885 A * | 9/1998 | Dew et al. | 700/3 |
| 5,809,045 A | 9/1998 | Adamiak et al. | |
| 5,812,389 A | 9/1998 | Katayama et al. | |
| 5,821,704 A | 10/1998 | Carson et al. | |
| 5,825,643 A | 10/1998 | Dvorak et al. | |
| 5,828,576 A | 10/1998 | Loucks et al. | |
| 5,828,983 A | 10/1998 | Lombardi | |
| 5,831,428 A | 11/1998 | Pyle et al. | |
| 5,862,391 A * | 1/1999 | Salas et al. | 713/300 |
| 5,867,385 A | 2/1999 | Brown et al. | |
| 5,872,722 A | 2/1999 | Oravetz et al. | |
| 5,872,785 A | 2/1999 | Kienberger | |
| 5,890,097 A | 3/1999 | Cox | |
| 5,892,449 A | 4/1999 | Reid et al. | |
| 5,903,426 A | 5/1999 | Ehling | |
| 5,905,616 A * | 5/1999 | Lyke | 361/64 |
| 5,906,271 A | 5/1999 | Castonguay et al. | |
| 5,926,089 A | 7/1999 | Sekiguchi et al. | |
| 5,936,817 A | 8/1999 | Matsko et al. | |
| 5,946,210 A | 8/1999 | Montminy et al. | |
| 5,958,060 A | 9/1999 | Premerlani | |
| 5,963,457 A | 10/1999 | Kanoi et al. | |
| 5,973,481 A | 10/1999 | Thompson et al. | |
| 5,973,899 A | 10/1999 | Williams et al. | |
| 5,982,595 A | 11/1999 | Pozzuoli | |
| 5,982,596 A | 11/1999 | Spencer et al. | |
| 5,995,911 A | 11/1999 | Hart | |
| 6,005,757 A | 12/1999 | Shvach et al. | |
| 6,005,758 A | 12/1999 | Spencer et al. | |
| 6,018,451 A | 1/2000 | Lyke et al. | |

| | | | | | | |
|---|---|---|---|---|---|---|
| 6,038,516 | A | 3/2000 | Alexander et al. | 6,441,931 B1 | 8/2002 | Moskovich et al. |
| 6,047,321 | A | 4/2000 | Raab et al. | 6,459,997 B1 | 10/2002 | Anderson |
| 6,054,661 | A | 4/2000 | Castonguay et al. | 6,496,342 B1 | 12/2002 | Horvath et al. |
| 6,055,145 | A | 4/2000 | Lagree et al. | 6,504,694 B1 * | 1/2003 | Bilac et al. ............ 361/93.2 |
| 6,061,609 | A | 5/2000 | Kanoi et al. | 6,535,797 B1 | 3/2003 | Bowles et al. |
| 6,084,758 | A | 7/2000 | Clarey et al. | 6,549,880 B1 | 4/2003 | Willoughby et al. |
| 6,138,241 | A | 10/2000 | Eckel et al. | 6,553,418 B1 | 4/2003 | Collins et al. |
| 6,139,327 | A | 10/2000 | Callahan et al. | 6,714,148 B1 | 3/2004 | Saga et al. |
| 6,141,196 | A | 10/2000 | Premerlani et al. | 2001/0010032 A1 | 7/2001 | Ehlers et al. |
| 6,157,527 | A | 12/2000 | Spencer et al. | 2001/0032025 A1 | 10/2001 | Lenz et al. |
| 6,167,329 | A | 12/2000 | Engel et al. | 2001/0044588 A1 | 11/2001 | Mault |
| 6,175,780 | B1 | 1/2001 | Engel | 2001/0048354 A1 | 12/2001 | Douville et al. |
| 6,185,482 | B1 | 2/2001 | Egolf et al. | 2001/0055965 A1 | 12/2001 | Delp et al. |
| 6,185,508 | B1 | 2/2001 | Van Doorn et al. | 2002/0010518 A1 | 1/2002 | Reid et al. |
| 6,186,842 | B1 | 2/2001 | Hirschbold et al. | 2002/0032535 A1 | 3/2002 | Alexander et al. |
| 6,195,243 | B1 | 2/2001 | Spencer et al. | 2002/0034086 A1 | 3/2002 | Scoggins et al. |
| 6,198,402 | B1 | 3/2001 | Hasegawa et al. | 2002/0045992 A1 | 4/2002 | Shincovich et al. |
| 6,212,049 | B1 | 4/2001 | Spencer et al. | 2002/0059401 A1 | 5/2002 | Austin |
| 6,222,714 | B1 | 4/2001 | Hoffman | 2002/0063635 A1 | 5/2002 | Shincovich |
| 6,233,128 | B1 | 5/2001 | Spencer et al. | 2002/0064010 A1 | 5/2002 | Nelson et al. |
| 6,236,949 | B1 | 5/2001 | Hart | 2002/0091949 A1 | 7/2002 | Ykema |
| 6,242,703 | B1 | 6/2001 | Castonguay et al. | 2002/0094799 A1 | 7/2002 | Elliott et al. |
| 6,268,991 | B1 | 7/2001 | Criniti et al. | 2002/0107615 A1 | 8/2002 | Bjorklund |
| 6,285,917 | B1 | 9/2001 | Sekiguchi et al. | 2002/0108065 A1 | 8/2002 | Mares |
| 6,288,882 | B1 | 9/2001 | DiSalvo et al. | 2002/0109722 A1 | 8/2002 | Rogers et al. |
| 6,289,267 | B1 | 9/2001 | Alexander et al. | 2002/0111980 A1 | 8/2002 | Miller et al. |
| 6,291,911 | B1 | 9/2001 | Dunk et al. | 2002/0116092 A1 | 8/2002 | Hamamatsu et al. |
| 6,292,340 | B1 | 9/2001 | O'Regan et al. | 2002/0124011 A1 | 9/2002 | Baxter et al. |
| 6,292,717 | B1 | 9/2001 | Alexander et al. | 2002/0146076 A1 | 10/2002 | Lee |
| 6,292,901 | B1 | 9/2001 | Lys et al. | 2002/0146083 A1 | 10/2002 | Lee et al. |
| 6,295,190 | B1 | 9/2001 | Rinaldi et al. | 2002/0147503 A1 | 10/2002 | Osburn, III |
| 6,297,939 | B1 | 10/2001 | Bilac et al. | 2002/0159402 A1 | 10/2002 | Binder |
| 6,313,975 | B1 * | 11/2001 | Dunne et al. ............ 361/64 | 2002/0162014 A1 | 10/2002 | Prydatek et al. |
| 6,341,054 | B1 | 1/2002 | Walder et al. | 2002/0163918 A1 | 11/2002 | Cline |
| 6,347,027 | B1 | 2/2002 | Nelson et al. | 2002/0165677 A1 | 11/2002 | Lightbody et al. |
| 6,351,823 | B1 | 2/2002 | Mayer et al. | 2002/0181174 A1 | 12/2002 | Bilac et al. |
| 6,356,422 | B1 | 3/2002 | Bilac et al. | 2002/0193888 A1 | 12/2002 | Wewalaarachchi et al. |
| 6,356,849 | B1 | 3/2002 | Jaffe | 2003/0043785 A1 | 3/2003 | Liu et al. |
| 6,369,996 | B1 | 4/2002 | Bo | 2004/0133367 A1 | 7/2004 | Hart |
| 6,377,051 | B1 | 4/2002 | Tyner et al. | | | |
| 6,385,022 | B1 | 5/2002 | Kulidjian et al. | FOREIGN PATENT DOCUMENTS | | |
| 6,396,279 | B1 | 5/2002 | Gruenert | EP | 0718948 A2 | 6/1996 |
| 6,397,155 | B1 | 5/2002 | Przydatek et al. | EP | 0723325 A1 | 7/1996 |
| 6,405,104 | B1 | 6/2002 | Dougherty | EP | 0949734 A2 | 10/1999 |
| 6,406,328 | B1 | 6/2002 | Attarian et al. | | | |
| 6,411,865 | B1 | 6/2002 | Qin et al. | * cited by examiner | | |

FIG. 11

DISTRIBUTED PROTECTION SYSTEM FOR POWER DISTRIBUTION SYSTEMS

CROSS REFERENCE TO RELATED APPLICATIONS

This application is related to U.S. Patent Application No. 60/359,544 filed on Feb. 25, 2002 and U.S. Patent Application No. 60/438,159 filed on Jan. 6, 2003, the contents of which are incorporated by reference herein. This application is a continuation-in-part of U.S. patent application Ser. No. 10/373,680 filed on Feb. 25, 2003 now U.S. Pat. No. 7,058,482. This application is also related to U.S. application Ser. No. 11/203,902, filed contemporaneously herewith.

BACKGROUND OF THE INVENTION

The present disclosure relates generally to power distribution systems. More particularly, the present disclosure relates to protection systems for power distribution systems.

Industrial power distribution systems commonly divide incoming power into a number of branch circuits. The branch circuits supply power to various equipment (i.e., loads) in the industrial facility. Circuit breakers are typically provided in each branch circuit to facilitate protecting equipment within the branch circuit. Circuit breakers are designed to open and close a circuit by non-automatic means and to open the circuit automatically on a predetermined over-current without damage to itself when properly applied within its rating. Since this automatic protection is based on conditions of the power (e.g., current), suppliers of circuit breakers have commonly made a large range circuit breakers to meet the various current demands, which can create inventory problems.

The inventory issue is made even more complex by the supplementary protectors that are often enclosed within the molded body of the circuit breaker. One common type of supplementary protector is known as an electronic trip unit. Electronic trip units typically include an analog-to-digital converter and a microprocessor. The electronic trip units receive signals from one or more sensors, such as, current transformers (CT's) and/or potential transformers (PT's). The sensors monitor a condition of the incoming power and provide an analog signal of the condition to the analog-to-digital converter. The A/D converter converts the analog signals from the sensors into digital signals, and provides the digital signals to the microprocessor. The microprocessor operates one or more control algorithms that provide the desired protection, monitoring, and control features.

The cost of each circuit breaker increases as the processing power of each microprocessor in its electronic trip unit increases. Namely, the cost of each circuit breaker increases as the complexity and number of protection features in the electronic trip unit is increased. Accordingly, suppliers of circuit breakers have also commonly manufactured a large range electronic trip units in the circuit breakers to meet the various consumer performance and price demands.

The large number of circuit breaker/trip unit combinations also adds cost and delay to the design and installation of the power distribution system. Moreover, it can increase the cost and delay associated with upgrading existing systems.

Accordingly, there is a continuing need for power distribution systems having low cost, easy to install components that provide the desired increased protection systems. It is also desired for such low cost components to ensure basic over-current protection in the event that other aspects of the protection fail.

SUMMARY OF THE INVENTION

The present disclosure provides for a protection system for a power distribution system having a plurality of breakers arranged in a hierarchy. The protection system has a network, a first breaker of the plurality of breakers that is coupled to the power distribution system, and a first module coupled to the network and the first breaker at a first level in the hierarchy. The first module samples an electrical condition of the power distribution system at the breaker and monitors the electrical condition for a predetermined trip condition. The first module, upon detection of the predetermined trip condition, trips the first breaker if the first level is a lowest level of the hierarchy, but monitors the network for a first notification message if the first level is not the lowest level of the hierarchy.

In various aspects of the present disclosure, the first notification message is generated by a second module. If a second breaker, coupled to the second module, is at higher level of the hierarchy than the first breaker coupled to the first module, and if the first module detects the first notification message, the first module trips the first breaker. The first module generates a trip message after the first module trips the first breaker. The first module, upon detecting the predetermined trip condition, generates a second notification of trip condition message for the network. If the second breaker is at a lower level of the hierarchy than the first breaker, the first module monitors for a third notification of trip condition message from the network. The first module monitors for the third notification of trip condition during a first time interval. The first module places a trip message on the network and trips the breaker if a trip condition is detected at an expiration of the first time interval. The first module extends the first time interval to a second time interval if the third notification of trip condition message is received during the first time interval. The first module places a trip message on the network and trips the breaker if a trip condition is detected at an expiration of the second time interval.

The present disclosure further provides for a method for protecting a power distribution system having a plurality of breakers arranged in a hierarchy. An electrical condition of the power distribution system at a first breaker of the plurality of breakers is sampled by a first module. A trip condition is detected by the first module based on the electrical condition. It is determined whether a level of the first breaker is a lowest level in the hierarchy. The first breaker is tripped by the first breaker if the level is the lowest level. A notification message is monitored for if the level is not the lowest level.

In various aspects of the present disclosure, a phaselet is generated as a function of the sampling of the electrical condition. The phaselet is conveyed to a network. The notification of trip condition is generated by a second module. A second notification message is transmitted on a network by the first module if a trip condition is detected. A current differentiator is employed to compare a plurality of lowest level breaker currents to a current of another breaker in the power distribution hierarchy. It is determined when currents of said plurality and the other breaker do not match. The tripping of a breaker is a main breaker of the hierarchy of breakers. Phaselet information is employed for a communication of a breaker current from a first breaker to a second breaker over a network. The communication is a sub-cycle communication. A designated source breaker is operated when the plurality of breaker currents do not match.

The present disclosure also provides for a storage medium for use with a power distribution system having a plurality of breakers arranged in a hierarchy. The storage medium has instructions for sampling an electrical condition of the power distribution system at a breaker by a first module. The storage medium also has instructions for detecting a trip condition by the first module based on the electrical condition. The first module also has instructions for determining whether a level of a first breakers of the hierarchy of breakers is a lowest level in the hierarchy. The first module also ha instructions for tripping the first breaker by the first module if said level is the lowest level. The first module has instructions for monitoring for a notification message if the level is not the lowest level.

In further aspects, the storage medium of claim has instructions for generating a phaselet as a function of the sampling of the electrical condition. The storage medium also has instructions for conveying the phaselet to a network for high level functions like the bus differential function described above. The storage medium also has instructions for generating said notification message by a second module.

The present invention also provides for a protection system for a power distribution system having a plurality of breakers arranged in a hierarchy. The protection system has a network, a first breaker of the plurality of breakers coupled to the power distribution system, and a first module coupled to the network and the first breaker at a first level in the hierarchy, the first module sampling an electrical condition of the power distribution system at said breaker and monitoring the electrical condition and said network for a control condition, the first module further broadcasting said electrical condition on said network to a second module. The first module, upon detection of said control condition, opens the first breaker.

In further aspects, the control condition is a demand request. The control condition employs a Boolean combination of breaker electrical condition and other breaker electrical conditions broadcast on the network. The control condition is programmed by selected from the group consisting of programmed locally or programmed over the network. The control condition employs a Boolean combination of system electrical conditions and discrete and analog user inputs, the Boolean combination broadcast on the network from a plurality of network-connected modules.

The present disclosure provides for a protection system for a power distribution system having a plurality of breakers arranged in a hierarchy. The protection system has a network and a plurality of modules coupled to the network and said plurality of breakers. The plurality of modules sample and store a plurality of raw samples indicative of a power distribution system status. The raw samples are time-tagged via a synchronization message received over said network. The power distribution system has a circular buffer module memory that stores the plurality of time-tagged raw samples, wherein said circular buffer module memory stops storing said plurality of raw samples after a local or system event, the local or system event having an associated event time. The circular buffer module memory stores the event time and a corresponding event description in the circular buffer module memory. The circular buffer module memory maintains the time-tagged raw samples, the event description, and the event time.

In further aspects, the raw samples are converted to a plurality of metering values, the metering values are time tagged and the time tagged metering values are stored for future access in the circular buffer module memory. The plurality of modules communicate over the network to a Human Machine Interface by transferring information in said the tagged circular buffers and the metering information in the circular buffer module memory.

BRIEF DESCRIPTION OF THE DRAWINGS

FIG. 11 illustrates an exemplary embodiment of a peer to peer system using breakers and modules of FIGS. 6-10.

DETAILED DESCRIPTION

Figure 1:
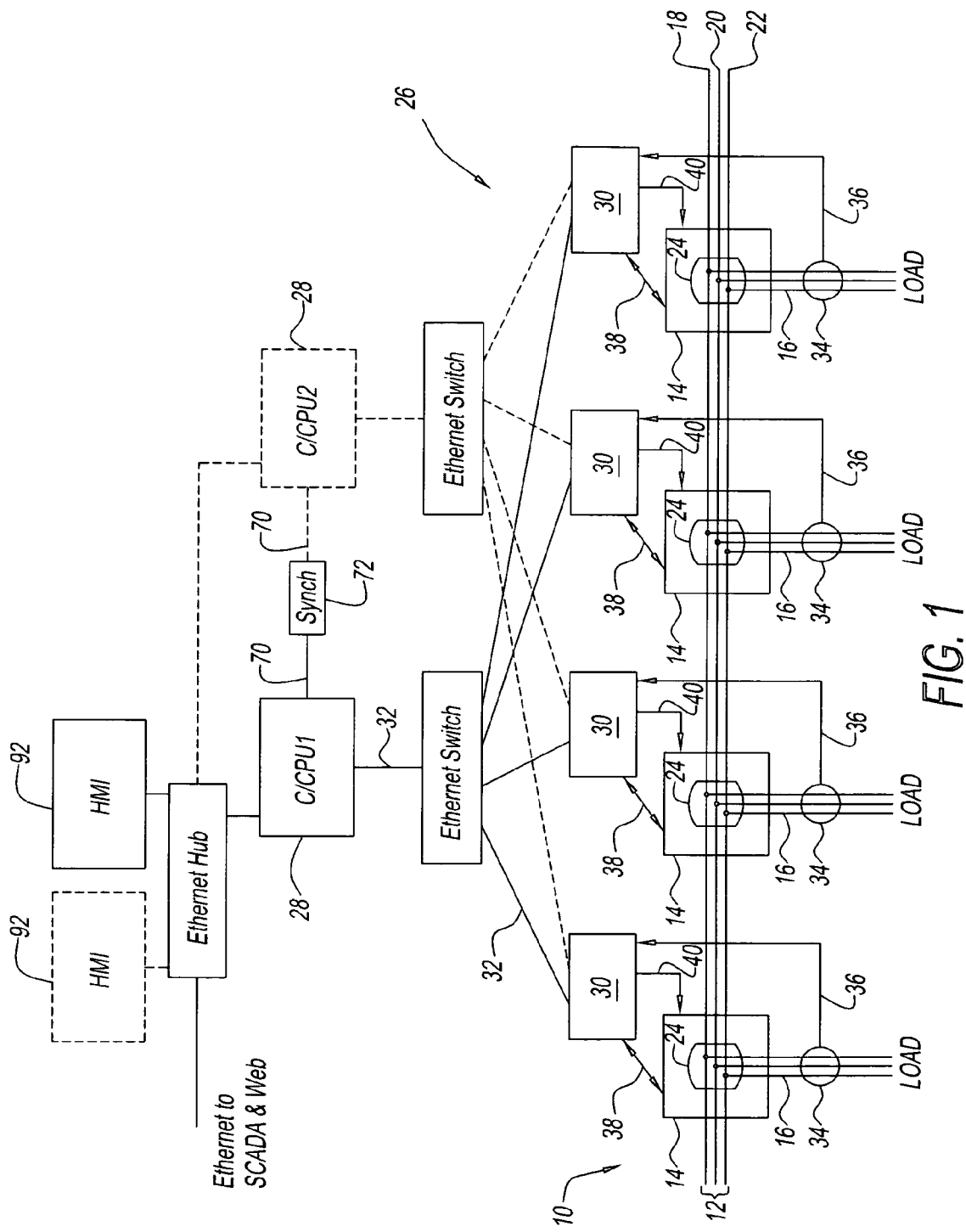
FIG. 1 is a schematic of an exemplary embodiment of a power system.

Referring now to the drawings and in particular to FIG. 1, an exemplary embodiment of a power distribution system generally referred to by reference numeral 10 is illustrated. System 10 distributes power from at least one power bus 12 through a number or plurality of circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs all primary power distribution functions for power distribution system 10. Namely, CCPU 28 performs all instantaneous overcurrent protection (10C), sort time overcurrent, longtime overcurrent, relay protection, and logic control as well as digital signal processing functions of system 26. Thus, system 26 enables settings to be changed and data to be logged in single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition of the incoming power in circuits 16 and provide a first signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position of separable contacts 24, a spring charge switch status, and others. In addition, module 30 is configured to operate circuit breaker 14 by sending one or more third signals 40 to the breaker to open/close separable contacts 24 as desired. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for managing collision domains.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

Figure 2:
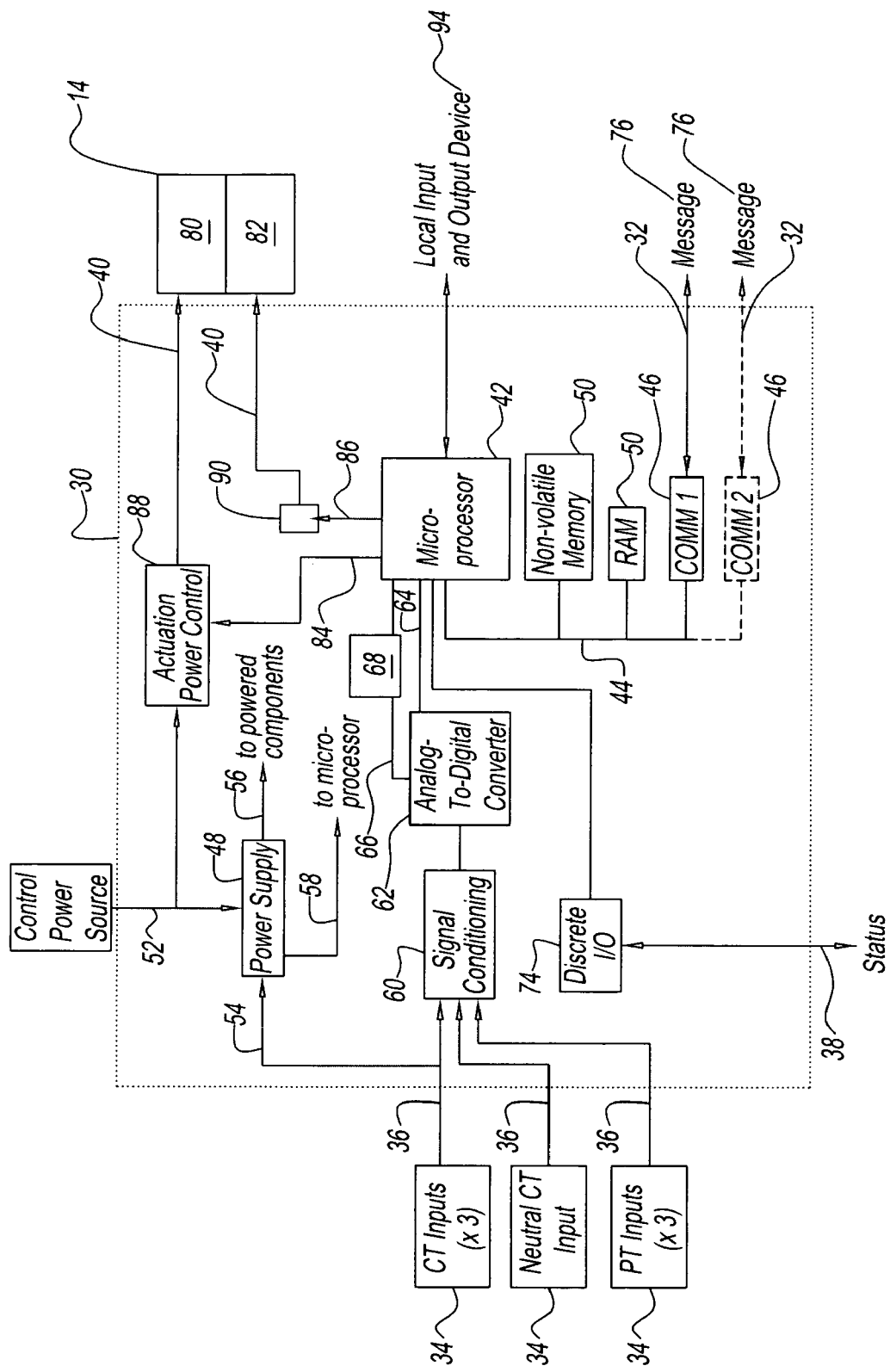
FIG. 2 is a schematic of an exemplary embodiment of a data sample and transmission module having an analog backup system.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can includes a filtering circuit (not shown) to improve a signal-to-noise ratio first signal 36, a gain circuit (not shown) to amplify the first signal, a level adjustment circuit (not shown) to shift the first signal to a pre-determined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system are synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to-port variability of network 32. In an exemplary embodiment, network 32 has a port-to-port variability of in a range of about 24 nanoseconds to about 712 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32.

In response to second message 78, microprocessor 42 causes third signal 40 to operate (e.g., open contacts 24) circuit breaker 14. Circuit breaker 14 can include more than one operation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated only when second source 54 is present. In this manner, microprocessor 42 can operate circuit breaker 14 in response to second message 78 regardless of the state of first and second sources 52, 54.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

It has been realized that CCPU 28 may be unable to control breakers 14 under some conditions. These conditions may include power outages in first source 52, initial startup of CCPU 28, failure of network 32, and others. Under these failure conditions, system 26 includes one or more backup systems to ensure that at least some protection is provided to circuit breaker 14.

Figure 3:
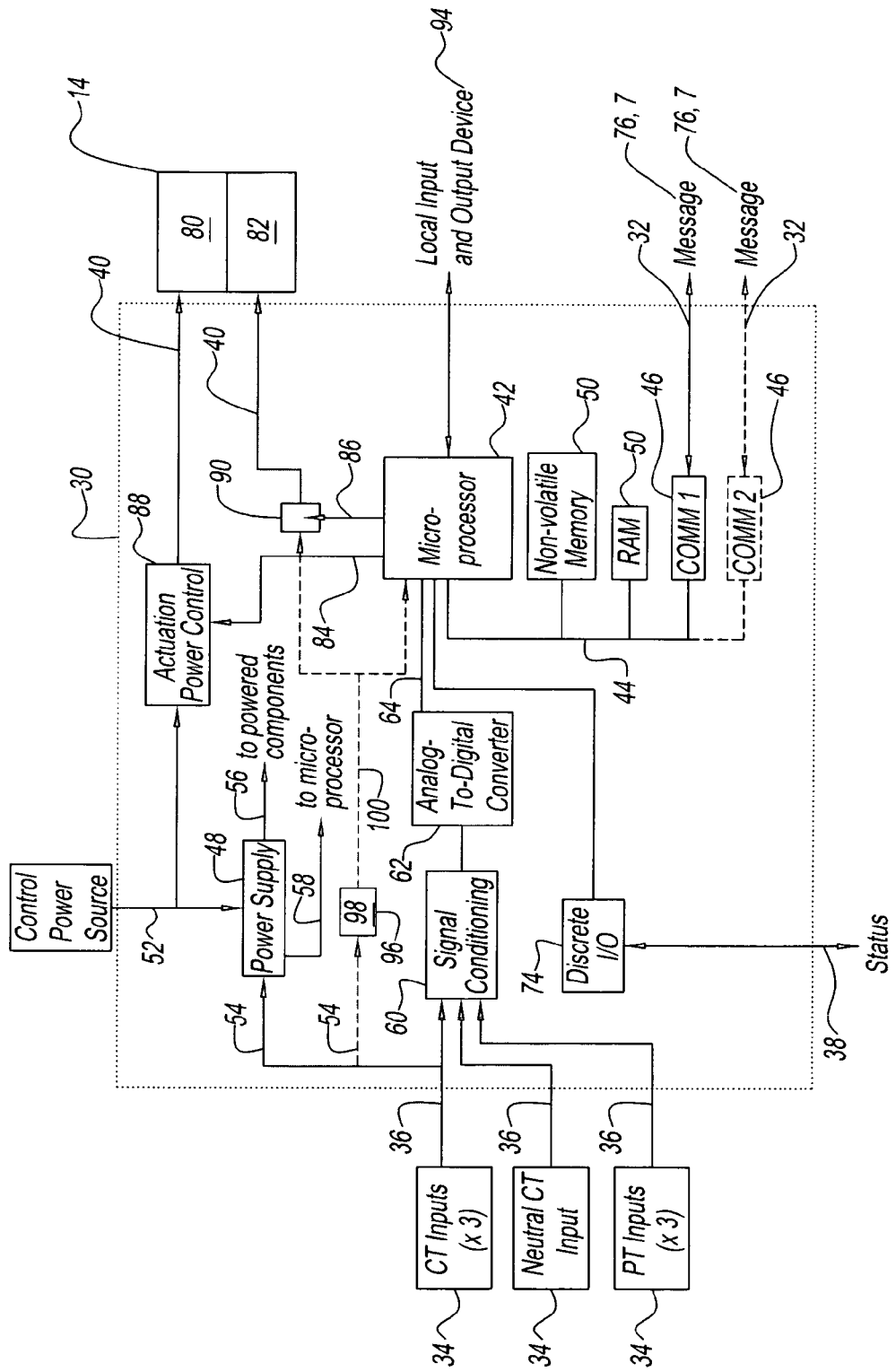
FIG. 3 is a schematic of the module of FIG. 2 having an exemplary embodiment of an analog backup system.

An exemplary embodiment of an analog backup system 96 is illustrated in FIG. 3, where some components of module 30 are omitted for purposes of clarity. Analog backup system 96 is an analog circuit 98 configured to operate circuit breaker 14 for selected fault conditions, even if system 26 is otherwise inoperative. Additionally, analog backup system 96 is powered from the secondary current available from sensors 34 (i.e., current transformers). Since analog backup system 96 is powered by second source 54, it can operate even in the absence of first source 52.

Analog circuit 98 receives the secondary current (e.g., second source 54) from sensors 34 and is configured to determine if an instantaneous over-current (IOC) fault is present in circuit 16. When analog circuit 98 determines that the IOC fault is present, the circuit provides a third output 100 to gating circuit 90 to operate solenoid 82. Third output 100 instructs gating circuit 90 to provide third signal 40 to solenoid 82 (i.e., flux shifter), which can separate contacts 24. In this manner, module 30 can operate circuit breaker 14 independent of the operational condition of system 26 and/or first source 52.

Analog backup system 96 can operate simultaneous with system 26 when the system is operational. In this embodiment, analog circuit 98 can also provide third output 100 to microprocessor 42 to notify the microprocessor of the fault condition.

Figure 4:
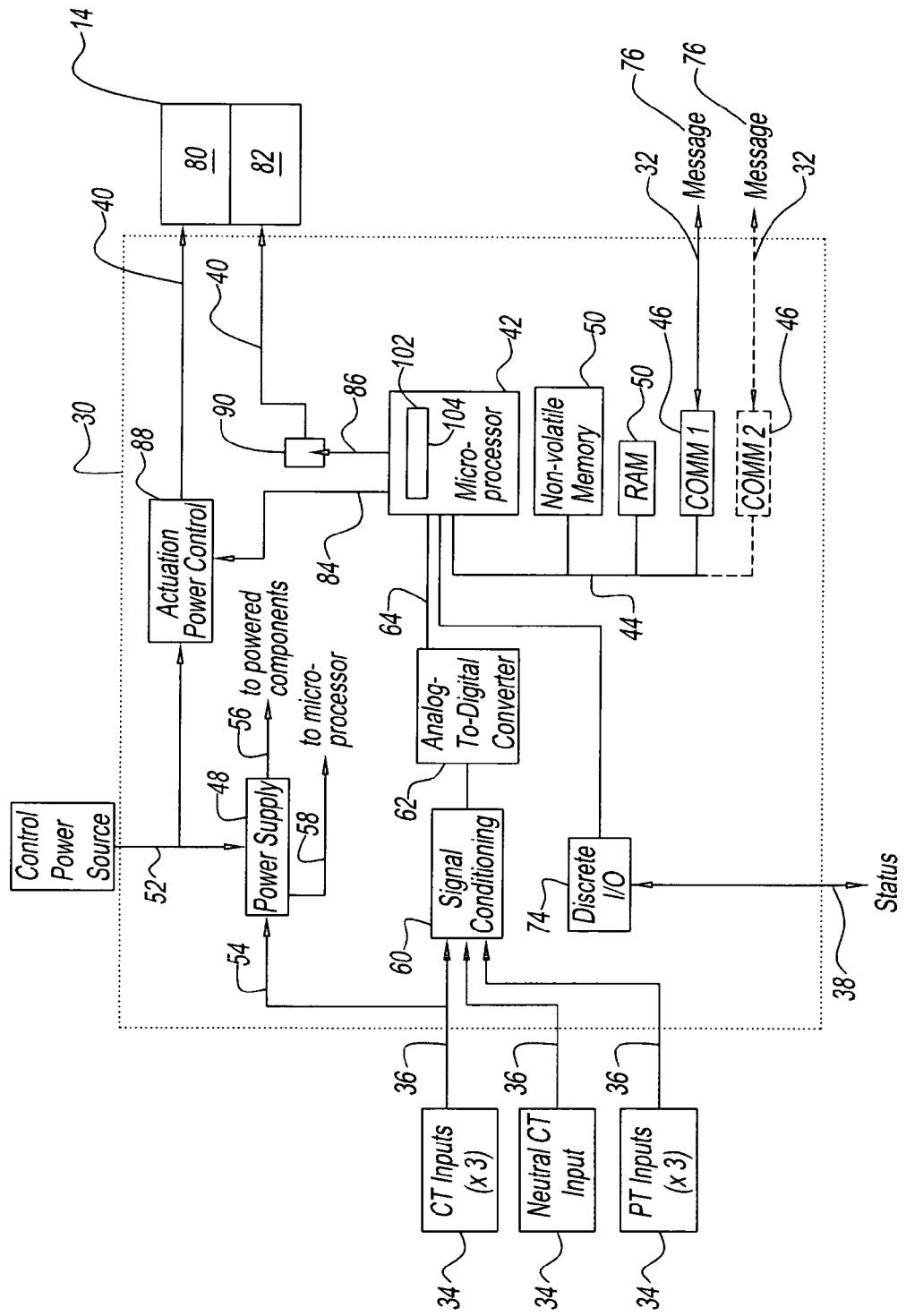
FIG. 4 is a schematic of the module of FIG. 2 having an exemplary embodiment of a digital backup system.

An exemplary embodiment of a digital backup system 102 is illustrated in FIG. 4. Digital backup system 102 can also operate circuit breaker 14 even if portions of system 26 are otherwise inoperative.

Digital backup system 102 includes microprocessor 42 and a back-up algorithm 104, which is resident on the microprocessor. Backup system 102 is configured to modify operation of microprocessor 42 to coordinate its power usage with power available from power supply 48. For example, microprocessor 42 receives fourth signal 58 from power supply 48. Again, fourth signal 58 is indicative of whether power supply 48 is receiving power from first source 52, second source 54, or both of the first and second sources.

Microprocessor 42 operates normally when fourth signal 58 indicates that power supply 48 is receiving power from first source 52 or from both first and second sources 52, 54. Under normal operation of microprocessor 42, system 26 is operational and requires the power available from first source 52.

However, backup system 102 can control microprocessor 42 to operate only algorithm 104 when fourth signal 58 indicates that power supply 48 is receiving power from only second source 54. Algorithm 104 is configured to operate with the power available from second source 54. For example, algorithm 104 can be a short time over-current algorithm, a long time over-current algorithm, and any combination thereof.

In the event algorithm 104 determines that a fault condition is present in circuit 16, microprocessor 42 sends second output 86 to operate solenoid 82. Again, second output 86 instructs gating circuit 90 to provide third signal 40 to solenoid 82, which can separate contacts 24. In this manner, digital backup system 102 can operate circuit breaker 14 in response to first and second signals 36, 38 independent of the operation status of system 26.

Digital backup system 102 can also be configured to reduce power consumed by microprocessor 42 by other methods alone or in conjunction with algorithm 104. For example, backup system 102 can reduce the power consumed by microprocessor 42 by slowing the clock speed of the microprocessor. Backup system 102 can also reduce the power consumed by microprocessor 42 by shutting off power 56 to internal and/or external peripherals, such as network interface 46, memory devices 50, local input and/or output devices 94, and others.

Accordingly, digital backup system 102 is adapted to operate circuit breaker 14 even if portions of system 26 are otherwise inoperative.

Figure 5:
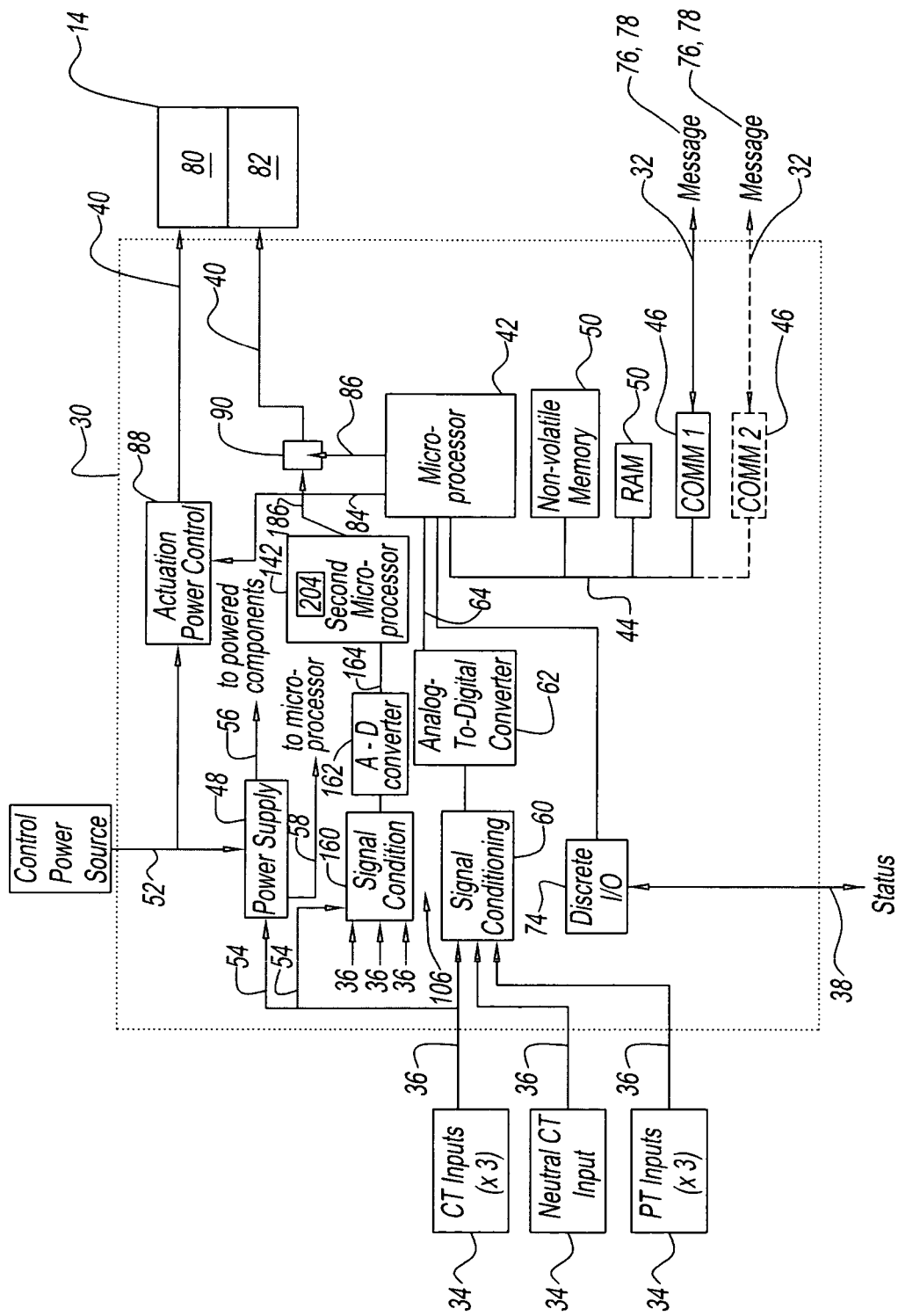
FIG. 5 is a schematic of the module of FIG. 2 having an alternate exemplary embodiment of a digital backup system.

An alternate embodiment of a digital backup system 106 is illustrated in FIG. 5. Digital backup system 106 has a second microprocessor 142, a signal conditioner 160, a second analog-digital converter 162, and an over-current protection algorithm 204, which is resident on the second microprocessor.

Power supply 48 provides power 56 to second microprocessor 142. Since second microprocessor 142 is running only algorithm 204, the second microprocessor can operate with the power available from second source 54. For example, algorithm 204 can be a short time over-current algorithm, a long time over-current algorithm, and any combination thereof.

In use, first signals 36 are conditioned by signal conditioner 160 and converted to digital signals 164 by A/D converter 162. Thus, digital backup system 106 collects first signals 36 and presents digital signals 164, representative of the raw data in the first signals, to microprocessor 142.

In the event algorithm 204 determines that a fault condition is present in circuit 16, microprocessor 142 sends a second output 186 to operate solenoid 82. Second output 186, much like second output 86 discussed above, instructs gating circuit 90 to provide third signal 40 to solenoid 82, which can separate contacts 24. In this manner, digital backup system 106 can operate circuit breaker 14 independent of the operational status of system 26.

The various exemplary embodiments of the backup systems are illustrated above for purposes of clarity exclusive of one another. However, it is contemplated by the present disclosure for system 26 have any combination of one or more of analog and digital backup systems 96, 102, 106.

Accordingly, each module 30 can control circuit breaker 14 based on second messages 78 from CCPU 28 (i.e., remote control) and can control the circuit breaker locally via one or more of the backup devices 96, 102, 106.

Advantageously, power distribution system 10 having system 26 provides multiple redundant levels of protection. One level of protection is provided by circuit breaker 14, which can open its separable contacts 24 automatically upon detection of an instantaneous over-current fault in circuit 16.

Other, higher levels of protection and monitoring are provided by system 26. CCPU 28 provides high level protection and monitoring based on the data transmitted across network 32 from modules 30. In addition, system 26 can include redundant CCPU's 28 and networks 32 communication with each module 30 to ensure the high level system protection and monitoring in the event of a failure of one of the redundant communication systems.

Finally, system 26 provides backup protection to power distribution system 10 by way of backup devices 96, 102, 106. In the event of a partial failure of certain portions of system 26, the backup devices can open separable contacts 24 of circuit breaker 14 upon detection of select fault conditions in circuit 16.

Moreover, system 26 provides these multiple protection redundancies without requiring the high cost, high complexity trip units of prior designs. Further, system 26 provides these multiple protection redundancies in system that is easy to install, design, and upgrade.

Figure 6:
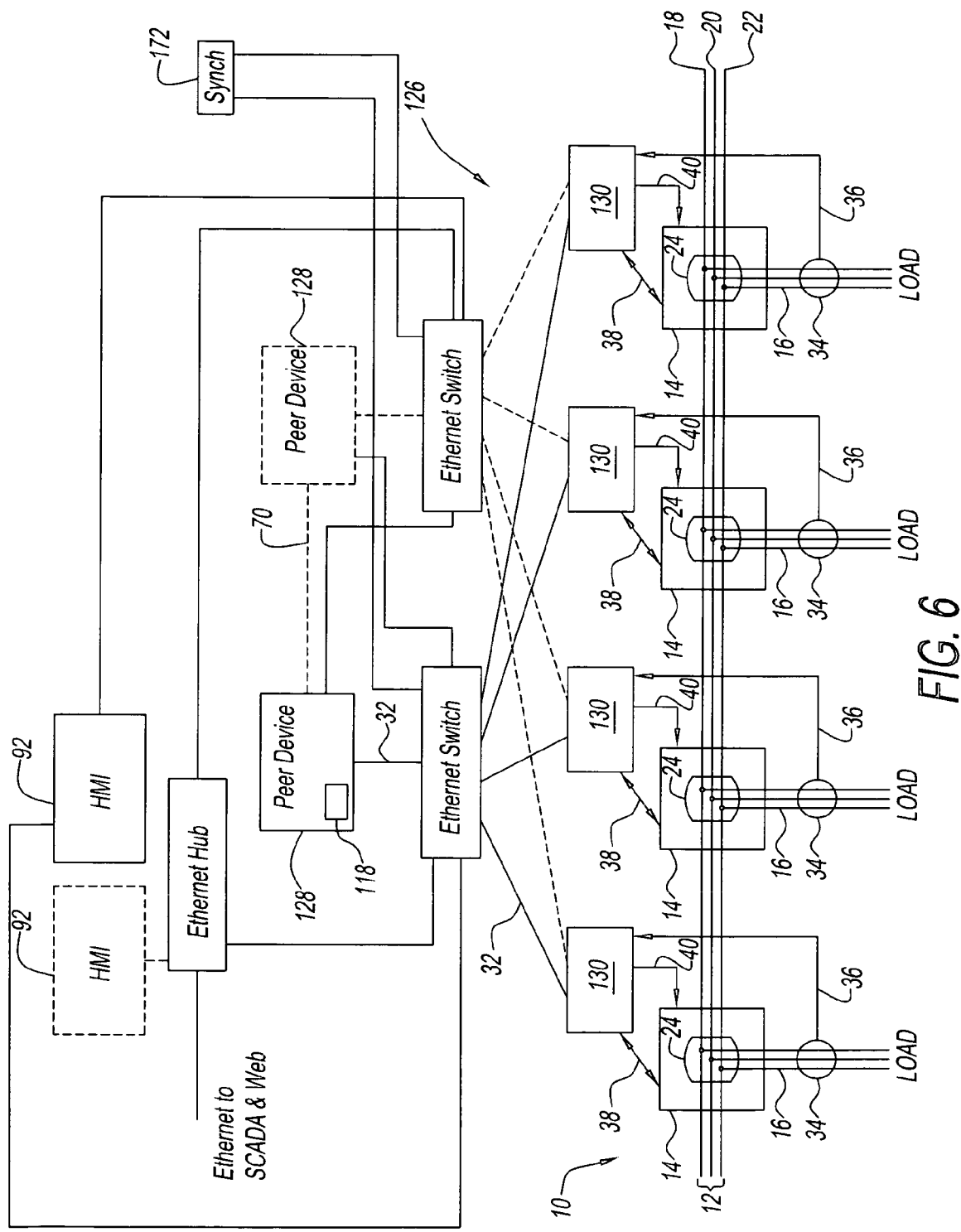
FIG. 6 is a schematic of an alternate exemplary embodiment of fault tolerant network based protection, monitoring, and control system according to the present disclosure.
Figure 7:
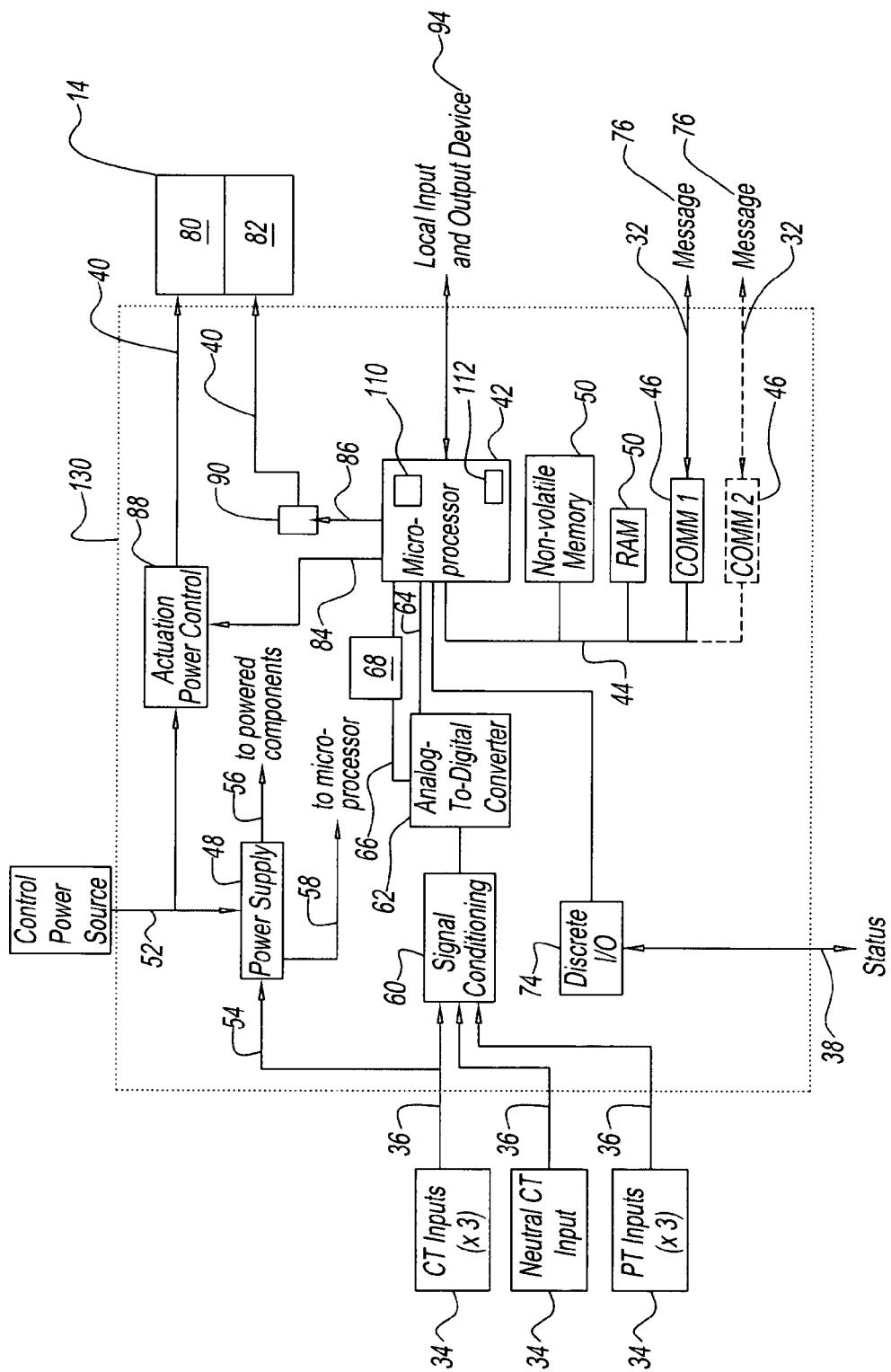
FIG. 7 is a schematic of an exemplary embodiment of a data sample and transmission module ("module") of FIG. 6.
Figure 11:
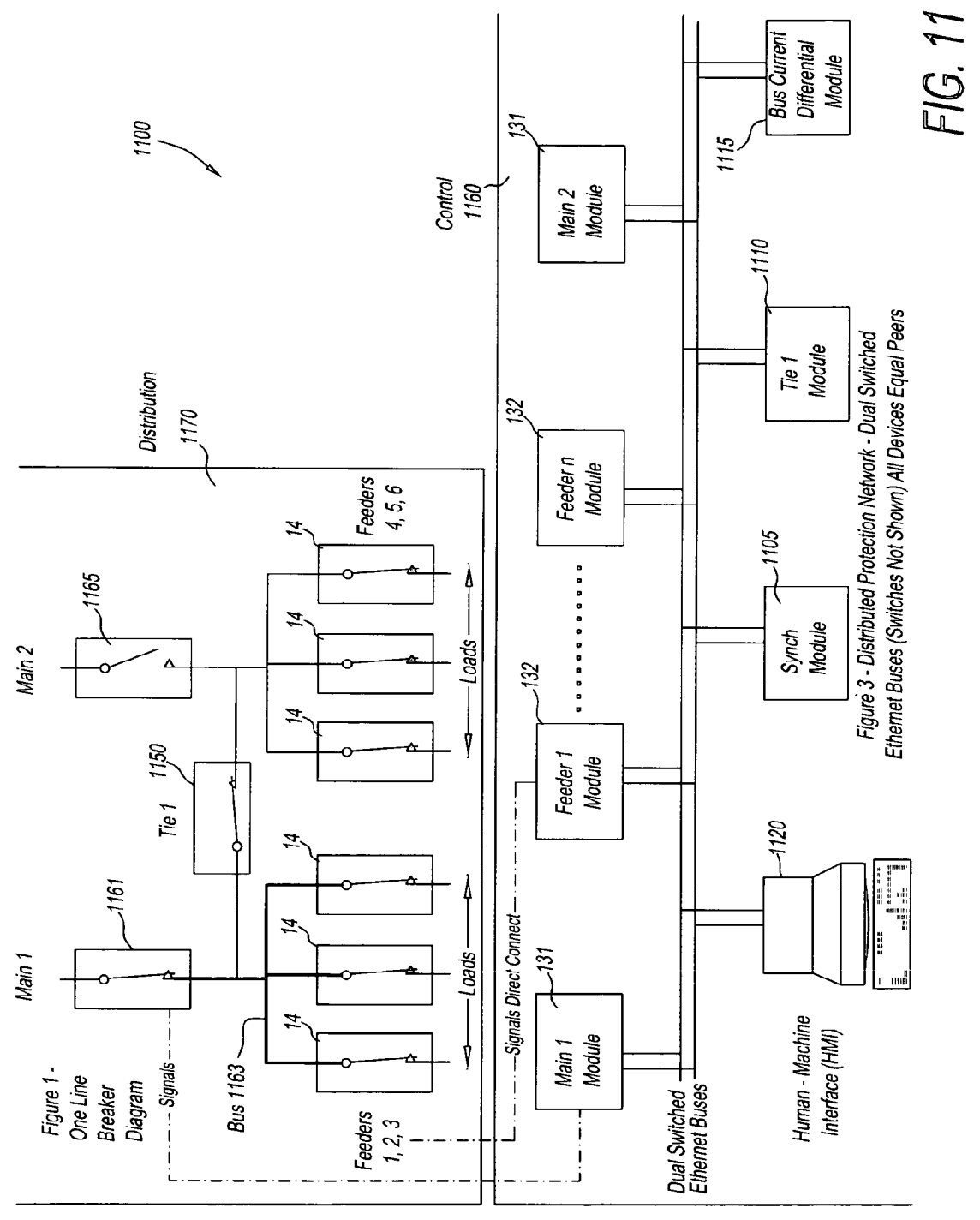

However, it has also been realized that the control of critical protection functions, such as overcurrent protection, by CCPU 28, as in system 26, may be undesired in all and/or portions of power distribution systems. Although it can be advantageous to have a centrally-controlled hierarchy of power distribution breakers by CCPU 28, as illustrated in FIGS. 1-5, it can also be advantageous to have "peer to peer" messaging and control of the various control modules controlling the breakers within the power distribution hierarchy instead. Accordingly, an exemplary embodiment of a fault tolerant network based protection, monitoring, and a control system 126 (hereinafter "system") for peer to peer monitoring is shown in FIGS. 6, 7 and 11, and methods for employment of peer-to-peer use of control modules in a hierarchical breaker power distribution system is described in FIGS. 8 and 9.

System 126 includes data sample and transmission modules 130 ("modules") that are configured to trip breakers 24 in a peer-to peer system using a peer device 128, and not hierarchically defined with respect to one another. Generally, peer device 128 monitors multiple devices, such as breakers 14. The tripping of breakers 14 is performed as a function of the level of its corresponding level of a hierarchy in a hierarchy of breakers 14.

In system 126, modules 130 performs relay protection and logic control as well as digital signal processing functions of system 126. Modules 130 also perform overcurrent protection.

Each breaker 14 has a corresponding hierarchical definition of whether it is a "low" breaker 14 or a "non-low" breaker 14. One example of a "low" breaker 14 is a feeder breaker. "Non-low" breakers 14 and "low" breakers 14 are hierarchically defined in respect to one another. Generally, a "low" breaker 14 can be defined as a breaker 14 that that feeds a load. A "non-low" breaker 14 can be generally defined as a module that has a breaker 14 that ultimately feeds at least one other breaker 14.

Furthermore, each breaker 14 can be defined as "higher" or "lower" than another breaker 14 within the same hierarchy of breakers. For example, a first breaker 14 feeds a second breaker 14. Therefore, first breaker 14 would be a "higher" breaker 14, and a second breaker 14 associated with second breaker 14 would be a "lower" breaker 14. In the hierarchy of breakers 14, it is possible for a first breaker 14 to be a "non-low" breaker 14, but a second breaker 14 to be "higher" in the hierarchy of breakers than the first breaker 14. Furthermore, first breaker 14 can be "higher" than second breaker 14, but "lower" than a third breaker 14, depending upon the placement of breaker 14 within a hierarchy of breakers.

Modules 130 include an overcurrent protection algorithm 110 and a module trip monitoring algorithm 112 ("trip monitoring algorithm 112"). In one embodiment, peer device 128 includes a higher-function trip monitoring algorithm 118 as shown in FIG. 6, while overcurrent protection algorithm 110 and module trip functioning algorithm 112 can be resident on microprocessor 42 of module 130 as shown in FIG. 7.

Furthermore, in FIG. 6, modules 130 are coupled in a peer to peer network. Each module 130 monitors the network for the technical effect of status changes (breaker openings or closings), manual inputs and power system information in the form of phaselets from other breaker modules 130. Each module 130 is programmed prior to startup to provide status information and power system information to the network based on the particular control or protection scheme desired by the user. Finally, each module 130 makes changes in local breaker status (on, off, trip) based on both measured power information at the said module and protection and control schemes programmed into said module 130. The peer to peer network includes non-breaker modules such as a synch controller 172, which broadcasts time synchronization messages to all other modules. In a similar fashion, other peer devices 128 can provide manual or remote inputs and/or can monitor the status and power information of selected breaker modules 130 over the network to provide outputs (status lights, startup of motor generators for backup power, etc.). Each addition of peer module may require re-configuration of breaker modules 130 programming, either to respond to inputs from the peer modules 128, or to provide information on the network for use by the peer module 128. This flexible peer to peer scheme provides capability to implement various protection or control schemes, such as automatic throwover.

Figure 8:
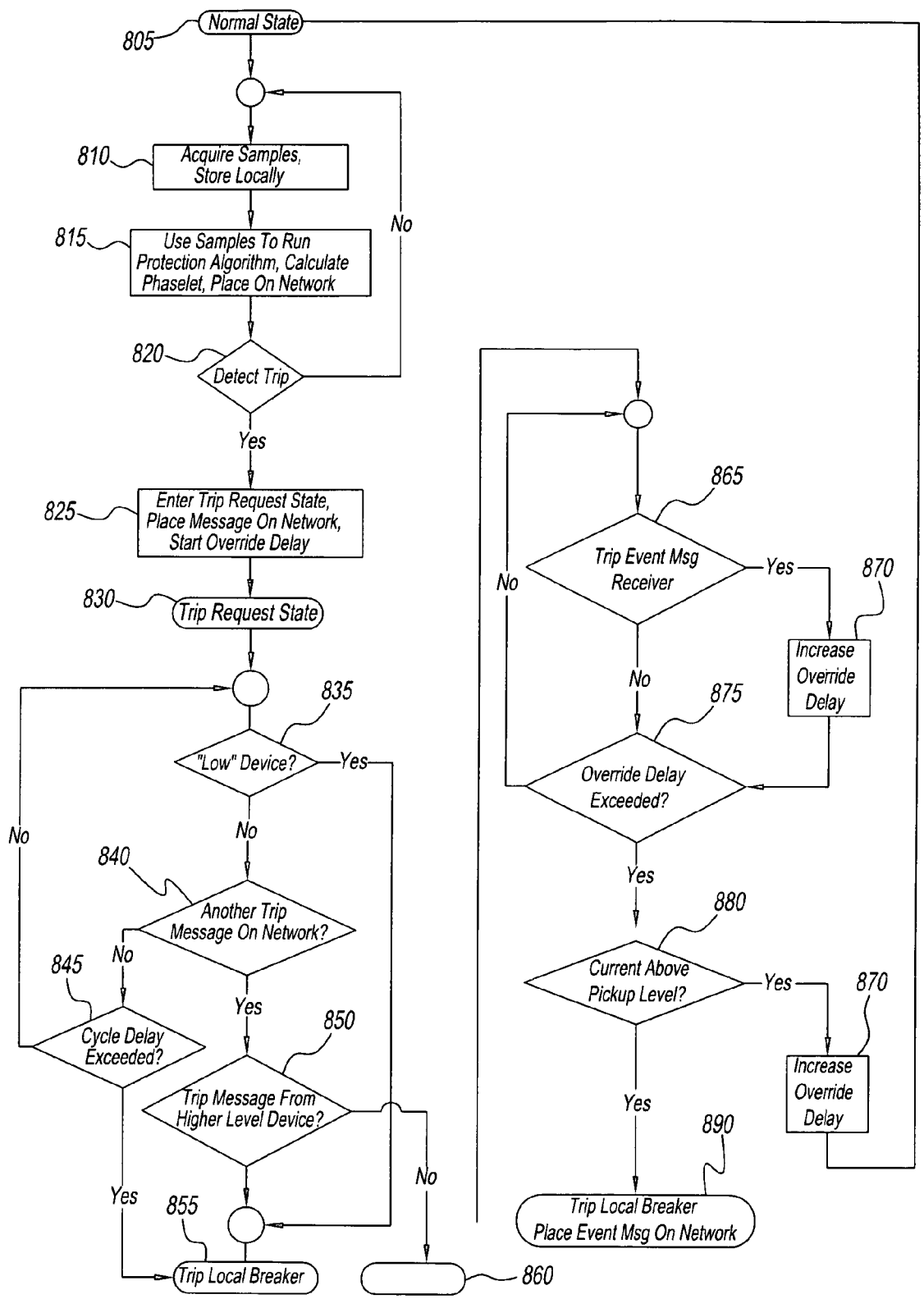
FIG. 8 illustrates an exemplary embodiment of a trip monitoring algorithm resident on the module of FIG. 7.

Referring now to FIG. 8, module trip monitoring algorithm 112 is described. In step 805, load trip points are loaded to modules 130, such as a first module 130 and a second module 130, from a human-machine interface (HMI) or a local programming device which loads the trip points, and the local device can also be removed.

Trip monitoring algorithm 112 has a normal state 805, a trip request state 830, and a trip hold state 860. Generally, normal state 805 corresponds to a state wherein module 130 is not checking or waiting for a notification of trip condition message from another module 130 coupled to a breaker 14 within the same hierarchy of breakers, nor is module 130 checking an override delay to determine whether module 130 should issue signal 40 to breaker 14 anyway, if module 130 has previously generated the notification of trip condition in its breaker 14. In trip request state 830, after placing a notification of trip condition message on network 32, module 130 determines whether it should trip immediately or be put in a hold state 860. Within hold state 860, if a notification of a trip condition is received from a lower level module 130, a holding time is compared to an override delay. A higher level trip message is ignored. Once the override delay is exceeded, module 130 determines whether a fault condition still exists. If not, trip algorithm 112 returns to the normal state. If the fault condition still exists, trip algorithm 112 trips its corresponding breaker 14, and sends a trip message on network 32.

In step 805, normal state commences. In normal state 805, trip points are downloaded to modules 130. These trip points are used for interpolation by modules 130. For example, a 19 point current level-trip time curve is downloaded to module 130 from peer device 128.

In step 810, samples are acquired by module 130. The samples include signals 36 and 38. The samples are then stored locally in module 130. The samplings are performed by module 130. In step 815, the samples are processed by module 130 from the second buffer after being copied from the first buffer. In any event, the buffer information are delivered onto network 32 for further processing or analysis, such as higher-order analysis of behavior of system 126 by peer devices 128.

In step 820, module 130 determines if, based upon the downloaded 19 point trip points, a trip condition is detected. If no trip condition is detected, trip monitoring algorithm 112 loops back to step 810. In a further embodiment, peer device 128 requests information from module 130, and module 130 provides this information. The 19 point trip point approach, however, is just one of a number of ways to download trip curve settings.

However, if a trip condition is detected, based upon signals 36 and 38, trip monitoring algorithm 112 enters a trip request state and advances to step 825. In step 825, a notification of trip condition message is placed on network 32 to be read by other modules 130. In step 835, module 130 determines whether its corresponding breaker 14 is a "low" device. If breaker 14 is a low device, such as a feeder breaker, then algorithm 112 advances to trip state 855. In trip state 855, module 130 issues signal 40 to its associated breaker 14. Module 130 also issues a notification that signal 40 has been generated (a "trip message") on network 30, to be monitored by other modules 130. In the event of signal 40, module 130 also stores signals 36 and 38 in raw sample form for 2-5 synchronized 172 cycles before and after third signal 40 is generated.

However, if a given breaker 14 is not a "low" device, algorithm 108 within its corresponding module 130 advances to step 840. In step 840, module 130 determines if there is either a trip message or another notification of a trip condition message, on network 32 from a module 130 that has a corresponding breaker 14 within the same breaker hierarchy. If there is neither, trip monitoring algorithm 112 advances to step 845. If there is either a trip condition message or notification of trip condition message (or both), trip monitoring algorithm 112 advances to step 850.

Step 845 correlates an initial delay in tripping. Generally, in step 845, module 130 has sent out a trip request, and it waits a very short period of time, enough for other modules 130 to respond, but if module 130 gets no response, it orders it breaker 14 to trip. In step 845, module 130 determines if a fixed number of clock cycles have occurred since it sent its original notification of trip condition message over network 32. In other words, module 130 determines whether a cycle delay is exceeded, i.e., whether the trip condition has been in existence without any other module 130 in the hierarchy generating either a notification of trip condition message, or a trip message. If the cycle delay is not exceeded, trip monitoring algorithm 112 loops back to step 835.

In step 850, module 130 determines if the received notification of trip condition message or trip message is from a module 130 corresponding to a higher lever breaker 14. If the received trip message or notification of trip condition message is from a module 130 corresponding to higher level breaker 14 compared to breaker 14 of module 130 that generated the notification of trip condition message in step 825, then the generating module 130 advances to trip state 855 and trips its breaker 14, described above.

However, if the trip message or notification of trip condition message received by module 130 was not from a module 130 coupled to a higher-level breaker 14, in other words, the trip message was received from a module 130 coupled to a breaker 14 that was defined as "lower-level" in the hierarchy of breakers, then module 130 enters into a trip hold state 860. Trip monitoring algorithm 112 then advances to state 865.

In state 865, module 160 monitors for a third message relating to tripping. These third messages can be either a notification of trip condition message or a trip message. If a third message is received, then step 870 executes. If no trip event message is received, step 875 executes.

In step 870, the override delay is increased. Generally, this is because trip messages denote that other modules 130 coupled to breakers 14 in the breaker hierarchy are also responding to the overage condition, and it may not be necessary for module 130 to trip. In algorithm 108, only a module 130 coupled to a lower level breaker 14 is able to launch a trip event message. If a selected module 130 has put a trip request on the network, all modules 130 coupled to higher-level breakers 14 should also be put in override delay long enough to let the selected lower module 130 trip its corresponding breaker 14 first. The magnitude in the increase in the override delay is a function of whether the third message is a trip message or a notification of a trip condition message.

The override delay of 870 is directed toward the case where a lower level breaker 14, which should trip and clear the fault, has fails (for whatever reason) and the fault is still present. Module 130 only gets to this state if a lower level module has sent a message that it sees a fault condition and plans to trip (i.e., the notification of trip condition message).

After executing step 870, trip monitoring algorithm 112 advances to step 875. In step 875, it is determined whether the override delay was exceeded. Generally, this is to stop module 130 from existing in a hold state for an unacceptable length of time (i.e., a length of time that might lead to excessive damage to loads or any further breakers 14, modules 130 etc. further down in the hierarchy of breakers). If the override delay is not exceeded, trip monitoring algorithm loops back to step 865. If the override delay is exceeded, trip monitoring algorithm advances to step 880.

In step 880, trip monitoring algorithm 112 is continuously sampling the current, calculating the RMS value and comparing it with the fault threshold. This is a check that the fault condition that initiated this process in step 820, still exists. For instance, module 130 coupled to a lower breaker 14 did not issue a trip command may be that the detected fault 'went away'. Therefore, in step 880, it is determined whether the signals 36 and/or 38 are above a threshold "pickup" level—i.e., have the signals exceeded a maximum allowable current, voltage, etc. If signals 36 and 38 have exceeded a maximum allowable threshold, step 890 executes. If signals 36 and 38 have not, step 885 executes.

In step 885, the override is reset. Because there is no longer a current or voltage overage condition as indicated by signals 36 and/or 38, trip monitoring algorithm 112 loops back to step 805.

In step 890, module 130 issues third signal 40 to its associated breaker 14. Module 130 also issues a notification of signal 40 (i.e., the "trip message") on network 30, to be monitored by other modules 130. Module 130 also sends information on system 126.

Figure 9:
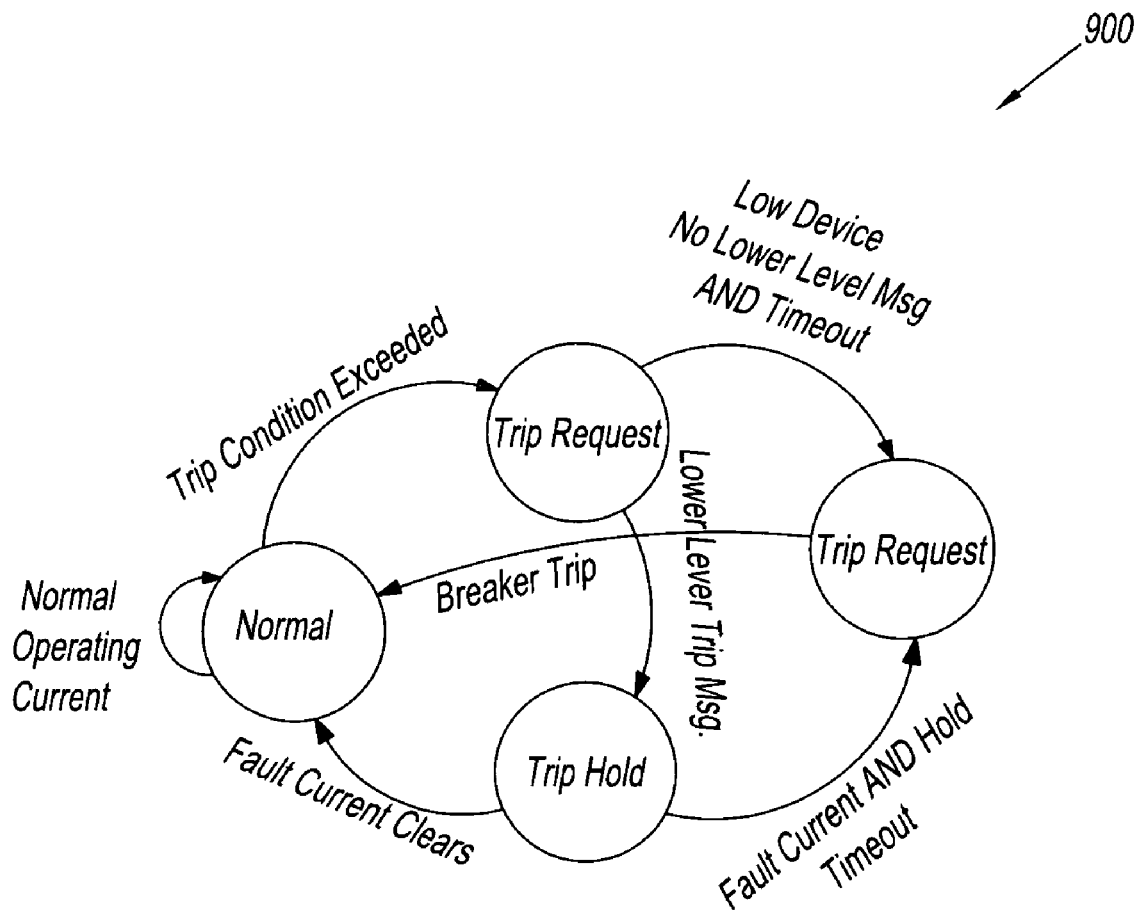
FIG. 9 illustrates a state diagram of the trip monitoring algorithm resident on the module of FIG. 8.

In FIG. 9, a state diagram 900 for trip monitoring algorithm 112 is described, corresponding to FIG. 8. In normal state 805, module 130 is in a non-tripped, non-holding state, and is not awaiting a notification of a trip condition message or a trip message. If module 130 measures, through signals 36 and 38, trip signals, such as current levels, that are not above an allowable threshold, then module 130 stays in state 910.

However, if module 130 determines that a trip threshold has been exceeded, then module 130 advances to state 830, the trip request state. In state 830, module 130 issues a notification of trip condition message. Module 130 also determines whether its corresponding breaker 14 is a "low" breaker 14. If it is, then state diagram 900 advances to trip state 855. If it is not a "low" breaker 14, its coupled module 130 also begins its override countdown to determine a time period in which it should receive either a trip message or a notification of trip condition message. If no message is received within a predetermined time period, state diagram 900 advances to trip state 855, and module 130 trips its corresponding breaker 14 through issuing third signal 40. Also, if a notification of trip condition message is received by module 130, but the message is from a higher module 130, state diagram 900 again advances to trip state 855.

However, if module 130 determines that a hold state is called for due to a notification of trip condition message or a trip message received from a lower module 130, then state 860, a holding state, is transitioned into by state diagram 900. Within state 860, module 130 awaits to determine if a third message, either a notification of trip condition message or a trip message, is received in a time period. If the error condition clears as read by signals 36 and 38, state transition diagram 900 loops back to normal state 805, and the override countdown is reset. However, if the override countdown finishes and the current over-threshold condition is still exceeded, step 890 is realized, and circuit breaker 14 is commanded to trip by module 130, and a trip message is sent over network 32.

In one embodiment, each breaker 14 is saving raw samples in a plurality of circular buffers, such as can be found in memory devices 50 in FIGS. 2-5 and 7. Memory device 50 can also include be or include a plurality of circular buffers.

When the circular buffer gets to the end, the circular buffer goes back to the beginning and starts to overwrite the data. When a fault occurs and a trip message/command third signal 40 is issued (by the module 130 or by another module that puts the trip message on the network), local module 130 compares the time tag of the time the trip was tagged to the occurrence time data in the buffer, and time correlates them both. Module 130 then lets the buffer in breaker 14 run for at least 2-5 cycles after the trip time, then module 130 freezes the buffer and switches the breaker 14 to another backup buffer. When module 130 freezes the first buffer, it also stores the trip message information (from itself or the network) and associates it with the first buffer. If there is an HMI device on the network, it can request this buffer information from all breakers 14. If there is synchronization on the network and if each breaker 14 allows its buffer to run exactly "n" cycles after the fault, a user can reconstruct the entire event as seen from any vantage point on network. This upload of samples does not need to occur immediately after the trip. In a further embodiment, there are more than two buffers. This storage of raw samples is sometimes referred to as 'waveform capture'. In this embodiment, the waveforms across the entire system 126 are synchronized to permit complete reconstruction of fault initiation. This waveform information, as well as other metering information which the module can readily calculate from the raw voltage and current samples, examples of which include, but are not limited to, RMS voltage, RMS current, peak voltage, peak current, power, reactive power, imaginary power and energy. Each module can be programmed to time tag and store these metering measurements and provide the information on request to a peer user interface device such as a HMI 1120.

Figure 10:
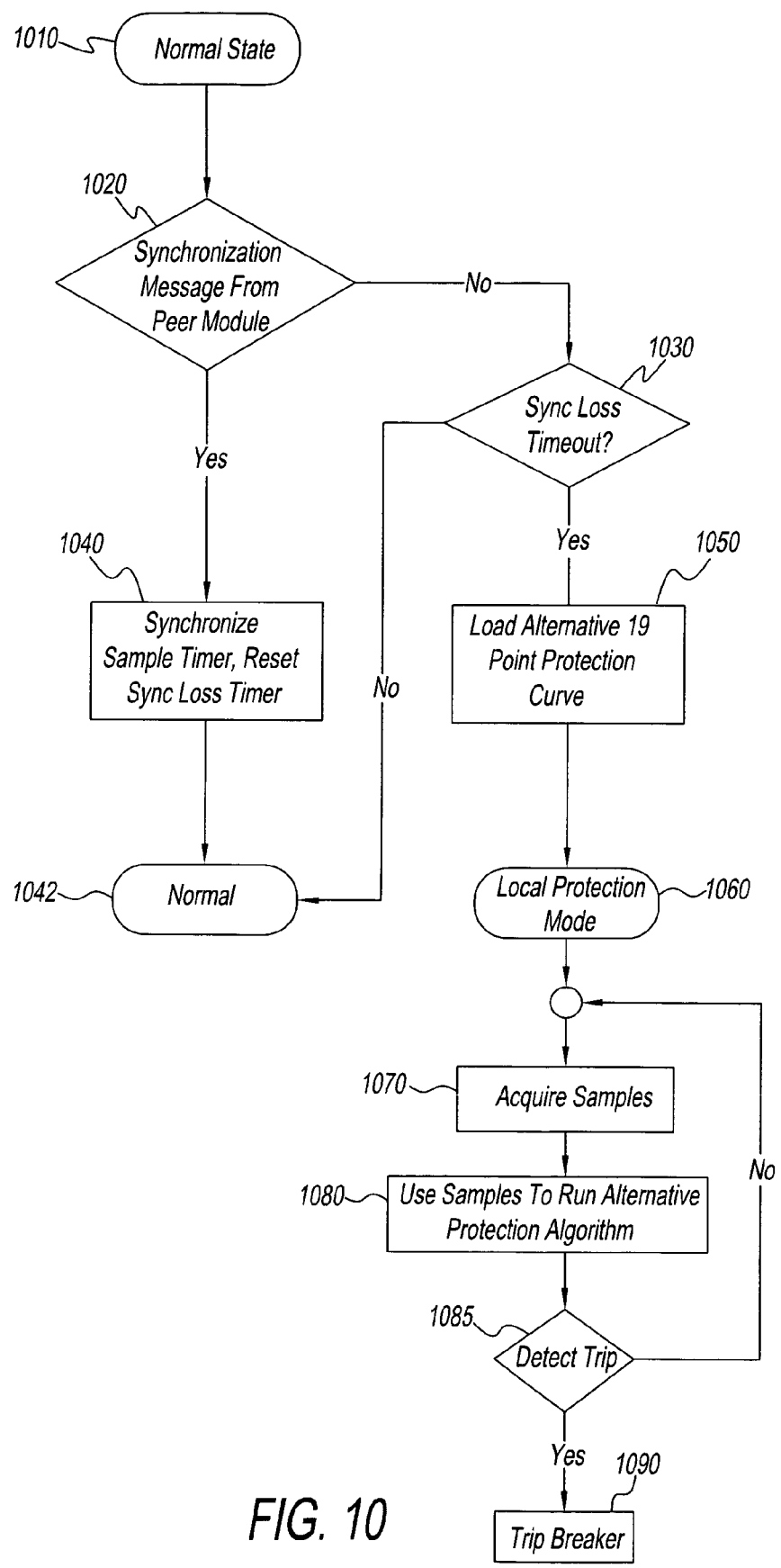
FIG. 10 illustrates an exemplary embodiment of an overcurrent protection algorithm.

Referring now to FIG. 10, an exemplary embodiment of algorithm 110 is described. Generally, FIG. 10 illustrates is an algorithm for changing from a module 130-driven trip strategy that is in communication with other modules 130 over system 126 to a locally-driven trip strategy, with no reference to any other modules 130.

Generally, in FIG. 10, module 130 includes normal state 1010 and a local protection mode 1060. During normal state 1010, module 130 controls overcurrent protection as described above with respect to FIG. 8 and FIG. 9. However during local protection mode 1060, module 130 controls overcurrent protection according to a second set of point protection points, and with no reference to any other modules 130. Module 160 continues to protect when the network fails. Generally, a $2^{nd}$ set of 'point protection points' is necessary because the $1^{st}$ set assumes network coordination of tripping and may have trip times for lower and higher modules very short to improve overall protection. When this coordination is removed, module 130 revert to a trip unit type condition in which coordination between higher and lower devices results from differences in trip pickup and time curves.

In step 1010, module 130 is functioning in a normal state, such as illustrated within state 805 of FIG. 8. However, in step 1020, module 130 tries to sense synchronization message from synchronization controller 172. If synchronization message from synch controller 172 is received by module 130, then in step 1040, a synch command countdown is reset. Furthermore, synchronization of sampling of data is performed. In one embodiment, when synchronization message from synchronization controller 172 is received, and waveform capture occurs. Then, step 1042, which is also normal state 1010, is entered.

However, if synchronization message from synchronization controller 172 has not been sensed by module 130 in step 1020, in step 1030, it is determined by module 130 whether a "synch loss timeout" has occurred. In other words, it is determined by module 130 whether a given amount of time has elapsed since the last reception of synchronization message from synchronization controller 172 by module 130. If the time allowed has not been exceeded before receiving synchronization message from synchronization controller 172, step 1042, the normal state, is entered into.

However, if in step 1030, it is determined that the time allotted to receive synchronization message from synchronization controller 172 has been exceeded, then in step 1050, alternative comparison points are downloaded or retrieved from a memory in system 126, overwriting previous comparison points which way have been downloaded in step 805 of FIG. 8. Alternative comparison points generally have a lower trip threshold than the comparison points loaded to modules 130 in step 805 of FIG. 8. This is because, among other reasons, each module 130 has to determine whether or not to trip its own breaker 14, and can not rely on making its determination based upon whether on not if receives a notification of trip condition message or a trip message from other modules 130.

Instead, modules 130 will each make its own determination of whether to trip without reference to messages from other modules 130. Generally, modules 130 use the second predefined set of trip points because a loss of synchronization message from synchronization controller 172 can mean that communication is lost between modules 130 and the "peer" module. If this occurs, modules 130 operate independently.

Therefore, module 130 can not rely on another breaker 14 stopping the current flow somewhere else. Therefore, module 130 independently makes a determination of whether to generate a signal 40 that may have to be faster than a determination made if messages from other modules 130 were received. Over-current algorithm 110 moves to step 1060, wherein module 130 is now in local protection mode.

In step 1070, module 130 continues to acquire samples of the voltage and/or current characteristics of the power distribution as determined by signals 36 and 38. In step 1080, the samples of step 1070 are compared against the values interpolated when using alternative comparison points downloaded in step 1050.

In step 1085, it is determined by module 130 whether a trip condition has occurred, using alternative comparison points memory and comparing them against first signal 36 and second signal 38. If a trip condition has not occurred, then algorithm 100 loops back to step 1070. However, if a trip condition has occurred, then in step 1090, circuit breaker 14 is tripped through module 130 issuing signal 40.

In a further embodiment, module 130 tries to sense synchronization message generated my synch controller 172 in step 1070, and if one is received, module 130 returns to normal state 1010.

It should be recognized that protection systems 26 and 126 are described above independent of one another. Of course, it is contemplated by the present disclosure for the protection system to have modules that include any combination of no backup system, analog backup system 96, digital backup systems 102, 106, trip monitoring algorithm 108, and over-current protection algorithm 110.

Turning now to FIG. 11, illustrated is a distributed peer-to-peer system ("system") 1100. In the system 1100, system 126 has a control area 1160 and a power distribution area 1170. Generally, the control area 1160 applies signals to the power distribution area 1170 to control various breakers 14 and high level breakers 1161 and 1165.

Power distribution systems provide protection as a core functionality. When a fault occurs due to mis-wiring or failure of insulation or failure of a load device such as overheating in a motor, electrical currents may exceed designed levels or flow to locations where equipment damage or personnel hazards may occur. The protection schemes such as overcurrent, phase loss, overvoltage functions guard against these problems and trip the circuit breaker in the path of the current. Power distribution systems also require control schemes. One example is an automatic throwover when power from the utility grid is lost.

FIG. 11 shows a basic two source main-tie-main system. In the case when one of the sources of power has been lost, no fault has occurred in the power distribution system; however, much of the user's installation may lose electrical power. An automatic throwover scheme provides the orderly sequence of breaker openings and closings to provide power from other connected sources. In a simpler control example, a user may wish to manually open a circuit breaker to allow safe maintenance of connected loads that are fed from this breaker.

Control area 1160 has a main module 1 131 and a main module 2 131. These are coupled to feeder 1 module 132, and to feeder "n" module 132. These are also coupled to a synch module 1105, a tie 1 module 1110, a bus current differential module 1115, and a HMI 1120. In one embodiment, modules 131 and 132 contain the functionality of both module 130 and peer device 128.

Distribution area 1170 has a high level circuit breaker ("main") 1161. Breaker 14 (feeders 1, 2, and 3) belongs to main 1161. Similarly, breakers feeders 4, 5, and 6 and belongs to main 2 1165. A tie 1150 couples main 1 1161 and main 2 1165. Feeders 1-6 are coupled to their respective loads. Breakers 14, main 1161 and main 1165 are in a hierarchical topology from an electrical power flow standpoint. Main 1 module 131 is coupled to main 1161 and main module 2 131 is coupled to main 1165. Similarly, feeder 1 module 132 and feeder n module 132 are coupled to feeders 1-3 and 4-6, respectively.

In control area 1160, main modules 131, feeder modules 132 and a tie module 1110 devices have significant processing power and do not need a central control to coordinate their actions. They only need a network, such as network 126, but individual modules 131 and 132 are in a peer to peer topology on network 126. Typically, all are equal. There is no master device controlling the operations. In one embodiment, there is a programming function used through HMI 1120, but if HMI 1120 is disabled, system 126 will still work for a distributed system.

In other words, there is no central control device that is a master to all functions in system 1100. In one preferred embodiment, the only time that modules 131 and 132 revert to local protection is when the network 126 fails. This can be evinced by a lack of synchronizing signals received from synch module 1105.

In one embodiment, significant real time calculations other than control of tripping can be performed on network 126 via a dedicated module. In one embodiment, this may be part of the HMI 1120. This type of module is the one that receives phaselet information from breakers 14 and can use this information to perform high level protection functions, such as current differential relaying, which requires real time measurement of all affected breakers.

Phaselets are subcycle partial calculations of phasors. A phasor typically represents a Fourier transformation of raw sample values to a vector that represents the fundamental frequency component of a signal. In a phaselet, in one embodiment, a quarter cycle's worth of raw samples are processed by the Fourier transform algorithm. Remote nodes can receive phaselets and sequentially reconstruct the fundamental current/voltage waveform of the node that sent the phaselets. Other algorithms can act on phaselet information before a complete cycle has occurred (which is normally required to calculate a phasor), providing rapid response to fault conditions. The use of phaselets here is primarily aimed at bus current differential in which currents measured from multiple breakers are compared to identify with great accuracy the relative location of a fault. In one embodiment, these phaselets provide information for peer device 128 used by higher-function trip monitoring algorithm 118 for higher-level protection functions and frequency calculations.

A bus current differential module 1115 is coupled on a bus and can be programmed to perform the function of current differential relaying. When bus current differential module 1115 senses a trip condition, it would send a trip message to whichever breaker 14 that needed to clear the fault. If the bus current differential module 1115 failed, it would have no effect on any of the other functions. However, the bus differential function could also be programmed into one of breakers 14 directly and therefore collect phaselets from other relevant breaker modules.

In control area 1160, main 1 module 131 and main 2 module 131 control main 1161 and 1165 for main 1 and main 2, respectively. Similarly, feeder 1 module 132 and feeder n module 132 both control breakers 14 for feeders 1-3 and 4-6, respectively. HMI 1120 allows a human to override and monitor samplings performed in system 126. Synch module 1105 allows for the synchronization signal 172 to be generated for various main modules 131 or feeder modules 132 to use the second set of downloaded independent trip points.

For ease of illustration, following is a discussion of FIG. 9 as it applies to FIG. 11. Feeder module 1 132 is in normal state 805. Feeder module 1 132 senses a trip condition, so it generates a notification of trip condition message, and advances to state 830. In state 830, feeder module 1 132 determines that its corresponding breaker 14 is a "low" breaker (e.g., a feeder breaker) in the hierarchy of breakers, so feeder module 1 132 advances to trip state 855 and issues a trip command to breaker 14.

In a next scenario, main 1 module 131 is in a normal state 805. Main 1 module 131 senses a trip condition, so it generates a notification of trip condition message, and advances to state 830. In state 830, main 1 module 131 determines that its corresponding breaker 14 is a "non-low" breaker 14, so further decisions are made by main 1 module 131. These decisions are as follows.

The first decision is if there is another trip message or notification to trip message from a lower level breaker 14 in the hierarchy of breakers. If not, has a timeout occurred. If yes, then again advance to state 855. However, if a trip message is received from a lower level module, such as feeder 1 module 132, then a trip hold state 860 is entered into. Within the hold state, if the fault current clears, normal state 805 is advanced to. If at the end of the hold time, module 130 determines that the trip condition is still current, module 130 orders its corresponding breaker to trip.

By reading and collecting phaselets from other breakers in the hierarchy of distribution 1170, additional protection such, as bus differential relaying may be implemented over network 32 (not illustrated). In the example of bus differential, a main breaker module 131 compares the current through its breaker 1160, 1165 with the sum of all currents of lower level breakers 14 connected to the load side of high level breaker 1161, 1165 (i.e., feeders 1-3 and 4-6, respectively). The current measurements of the lower breakers 14 are received over network 32 as phaselets and reassembled in high level breaker 1161, 1165. During setup, breakers 14 that are to provide their phaselets over network 132 will be programmed to perform this function.

If the currents do not match (between the high level 1161, 1165 and all connected breakers 14 that are lower in the breaker hierarchy), there is a fault condition between high level breaker 1161, 1165 and lower breakers 14. High level breaker 1161, 1165 will trip to clear this fault.

Employment of bus differential allows very sensitive protection for faults on the bus between the main and lower feeder breakers, such as a bus 1163. On a conventional system, high level breaker 1161, 1165 has only overcurrent protection, which is set at a high operating level because normal operating currents can be the sum of all feeder breakers 14 that are lower in the hierarchy. Without a bus differential for a bus, such as a bus 1163, when a fault occurs on the bus, significant damage can occur before the normal overcurrent setting of high level breaker 1161, 1165 trips main 1161, 1165. The bus differential can operate at much lower currents (and resulting damage levels). When main 1161, 1165 trips due to bus differential, it will issue the notification of trip condition on the network.

In one embodiment of the system 1100, actions performed by bus current differential module 1115 and a current differential performed by main breakers 1161, 1165 can be substantially the same thing. One advantage of the flexibility of the system 1100 is if a particular breaker module is stressed to the limits of its processing capability, another peer module can be added to the system to perform just this function.

In a further embodiment of FIG. 11, control 1160 is used as to control various breakers. Generally, a control system is used to help ensure that input current is distributed properly, and that variations in the application of adequate current or power are adequately compensated for. In FIG. 11, this is typically performed by routing current over a tie 1 1150 to feed the various breakers 14, feeders 1 through 6.

For example, high level breaker 1 1160 senses that the line voltage at high level breaker 1 1161 is lower than it should be, or is otherwise notified that the voltage at main level 1 1161 will be dropping below an acceptable level. The main module opens the main breaker and broadcasts the loss of voltage and its opening on the network. Therefore, tie module 1150 triggers tie 1 1150 to close after main 1 has opened, as is illustrated in FIG. 11. Then, after feeders 1-3 are fed by main 2 1165. All feeders 1-6 receive current from main 2 1165. This helps to ensure that there is no interruption in power to loads or feeders 1-6, thereby adding to the utility of the system.

Furthermore, within system 1100, due to the peer to peer nature, system 1100 is highly scalable. With conventional systems that use a centralized processor, each function or module added is an "add-on" and the cost and wiring complexity can become daunting. In other words, with a centralized control, there is a substantial, minimum "buy-in" to employ the conventional centralized control system. For instance, redundant CCPUs, networks, switches, supplies, and so on, need to be purchased for each system (i.e., this is the infrastructure for the system). Although one embodiment of an infrastructure can handle a maximum of 30 breakers, however, substantially all of the infrastructure would be required for 2 breaker customers.

In distributed system 1100, however, through employment of peer to peer modules, the infrastructure necessary can, in one embodiment, be limited to network and any power supplies. In other words, as the number of breaker modules grows, the processing power of system 1100 scales directly, because each module brings its own processor to do the processing work. In one embodiment, employment of the system 1100 (peer to peer) approach keeps samples locally and only sends phaselets every half cycle, and only then if programmed to do so.

In further aspects, a control condition is a demand request. Electrical utilities may offer differential prices of electricity based on overall demand on the utility system. Industrial users can advantageously reduce their electrical bill by reducing power during these periods of high utility demand. The electrical utility sends a control signal to the industrial business indicating that the current period is a high demand period (an example would be a hot, summer day when most electrical utility users operate air conditioners). This signal would be entered into the system via a discrete input at one of the breaker modules. For the system of FIG. 11, assume that the discrete input for demand request has entered at Main 1 module 131. This module broadcasts the demand signal to other breakers on the network. Some of the Feeder breaker modules 132 will receive this signal over the network. This demand signal can create a control condition which employs a Boolean combination of the demand request signal, the breaker electrical condition and other control conditions broadcast on the network such as time of day to cause the breaker module to open the breaker and reduce the electricity that the industrial user uses. When the demand request signal is removed by the utility, Main 1 module 131 broadcasts this new control input and using another Boolean combination, feeder breakers that opened may reclose.

Control conditions are programmed by selected from the group consisting of programmed locally or programmed over the network. The control condition employs a Boolean combination of system electrical conditions and discrete and analog user inputs, the Boolean combination broadcast on the network from a plurality of network-connected modules.

It should also be noted that the terms "first", "second", "third", "upper", "lower", and the like may be used herein to modify various elements. These modifiers do not imply a spatial order to the modified elements unless specifically stated.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

The invention claimed is:

1. A protection system for a power distribution system having a plurality of breakers arranged in a hierarchy, the protection system comprising:
   a network;
   a first breaker of said plurality of breakers coupled to the power distribution system;
   a first module coupled to said network and said first breaker at a first level in the hierarchy, said first module sampling an electrical condition of the power distribution system at said first breaker and monitoring said first electrical condition for a predetermined trip condition;
   a synch controller coupled to said network, said synch controller broadcasting a time synchronization message to all modules coupled to said network,
   wherein said first module, upon detection of said predetermined trip condition and receipt of said time synchronization message within a predetermined period of time, trips said first breaker if said first level is a lowest level of the hierarchy, but monitors said network for a first notification message if said first level is not said lowest level of the hierarchy, and
   wherein said first module, upon detection of said predetermined trip condition and failure to receive said time synchronization message within said predetermined period of time, trips said first breaker regardless of said first level.

2. The protection system of claim 1, wherein said first notification message is generated by a second module.

3. The protection system of claim 2, wherein if a second breaker coupled to said second module is at higher level of the hierarchy than said first breaker coupled to said first module and if said first module detects said first notification message, said first module trips said first breaker.

4. The protection system of claim 3, wherein said first module generates a trip message after said first module trips said first breaker.

5. The protection system of claim 1, wherein said first module, upon detecting said predetermined trip condition, generates a second notification of trip condition message for said network.

6. The protection system of claim 2, wherein if said second breaker is at a lower level of the hierarchy than said first breaker, said first module monitors for a third notification of trip condition message from said network.

7. The protection system of claim 6, wherein said first module monitors for said third notification of trip condition during a first time interval.

8. The protection system of claim 7, wherein said first module places a trip message on said first network and trips said first breaker if a trip condition is detected at an expiration of said first time interval.

9. The protection system of claim 7, wherein said first module extends said first time interval to a second time interval if said third notification of trip condition message is received during said first time interval.

10. The protection system of claim 9, wherein said first module places a trip message on said first network and trips said first breaker if a trip condition is detected at an expiration of said second time interval.

11. A method for protecting a power distribution system having a plurality of breakers arranged in a hierarchy, comprising:
   sampling an electrical condition of the power distribution system at a first breaker of the plurality of breakers by a first module;
   detecting a trip condition by said first module based on said electrical condition;
   detecting receipt of a time synchronization message by said first module within a predetermined period of time; and
   determining whether a level of said first breaker is a lowest level in the hierarchy, if receipt of said time synchronization message within said predetermined period of time is detected, then tripping said first breaker by said first breaker if said level is the lowest level or monitoring for a notification message if said level is not the lowest level, and if receipt of said time synchronization message within said predetermined period of time is not detected, then tripping said first breaker by said first breaker regardless of said level.

12. The method of claim 11, further comprising generating said notification of trip condition message by a second module.

13. The method of claim 11, further comprising transmitting a second notification message on a network by said first module if a trip condition is detected.

14. The method of claim 11, further comprising:
employing a current differentiator to compare a plurality of breaker currents which source or feed current to a common power bus or device in the power distribution hierarchy; and
determining when a vector summation of said currents of said plurality of breakers do not match.

15. The method of claim 14, further comprising generating a phaselet as a function of said sampling of said electrical condition.

16. The method of claim 15, further comprising tripping at a main breaker in the hierarchy of breakers.

17. The method of claim 15, further comprising employing phaselet information for a communication of a breaker current from a first breaker to a second breaker over a network.

18. The method of claim 17, wherein said communication is a sub-cycle communication.

19. The method of claim 14, further comprising operating a designated source breaker when currents of said plurality of breakers do not match.

* * * * *